(12) United States Patent
Marin

(10) Patent No.: US 11,891,460 B2
(45) Date of Patent: Feb. 6, 2024

(54) ACTIVATED CATALYST COMPONENTS FOR OLEFIN POLYMERIZATION

(71) Applicant: W.R. Grace & Co.-CONN., Columbia, MD (US)

(72) Inventor: Vladimir Marin, Houston, TX (US)

(73) Assignee: W. R. Grace & Co.-Conn., Columbia, MD (US)

( * ) Notice: Subject to any disclaimer, the term of this patent is extended or adjusted under 35 U.S.C. 154(b) by 170 days.

(21) Appl. No.: 17/609,139

(22) PCT Filed: May 7, 2020

(86) PCT No.: PCT/US2020/031756
§ 371 (c)(1),
(2) Date: Nov. 5, 2021

(87) PCT Pub. No.: WO2020/231716
PCT Pub. Date: Nov. 19, 2020

(65) Prior Publication Data
US 2022/0162356 A1 May 26, 2022

Related U.S. Application Data

(60) Provisional application No. 62/846,130, filed on May 10, 2019.

(51) Int. Cl.
*C08F 10/06* (2006.01)

(52) U.S. Cl.
CPC .................. *C08F 10/06* (2013.01)

(58) Field of Classification Search
CPC ...... C08F 10/06; C08F 110/06; C08F 210/06; C08F 4/6465; C08F 4/6435
See application file for complete search history.

(56) References Cited

U.S. PATENT DOCUMENTS 6,100,351 A * 8/2000 Sun .................. C08F 10/00
526/128
9,790,291 B2 10/2017 Xu et al.
(Continued)

FOREIGN PATENT DOCUMENTS

EP          2 206 731 A    7/2010
RU          2446176 C2     3/2012
(Continued)

OTHER PUBLICATIONS

International Search Report for PCT/US2020/031756 dated Aug. 4, 2020, 3 pages.
(Continued)

*Primary Examiner* — Catherine S Branch
(74) *Attorney, Agent, or Firm* — Foley & Lardner LLP

(57) ABSTRACT

An activated solid catalyst component is disclosed formed from a magnesium compound, a titanium compound, an organosilicon compound, a supportive electron donor, and at least one internal electron donor. The solid catalyst component is activated to include titanium and carbon bonds by reaction with an activation agent, such as an aluminum compound. In one embodiment, small amounts of polymer are polymerized with the catalyst component during activation. The activated catalyst component is stable and, when formed, can later be used to produce various polyolefin polymers. The activated catalyst component has controlled reaction kinetics so that the catalyst does not overheat and degrade during initial polymerization.

20 Claims, 6 Drawing Sheets

(56) References Cited

U.S. PATENT DOCUMENTS

2001/0044375 A1    11/2001   Shinozaki et al.
2011/0152481 A1     6/2011   Chang

FOREIGN PATENT DOCUMENTS

| RU | 2673083 C2 | 11/2018 |
| RU | 2020119397 A | 12/2021 |
| WO | WO-03/002617 A1 | 1/2003 |
| WO | WO-2009/083522 A1 | 7/2009 |
| WO | WO-2013/082631 A1 | 6/2013 |

OTHER PUBLICATIONS

Foreign Search Report on EP patent application No. 20805935.2 dated Jan. 24, 2023 (15 pages).
Foreign Action from Russia Patent Application No. 2021132729, dated Sep. 11, 2023, 2 pages.

* cited by examiner

ACTIVATED CATALYST COMPONENTS FOR OLEFIN POLYMERIZATION

CROSS-REFERENCE TO RELATED PATENT APPLICATIONS

This application is a U.S. National Phase Application under 35 U.S.C. § 371 of International Application No. PCT/US2020/031756, filed May 7, 2020 which claims the benefit of priority to U.S. Provisional Application No. 62/846,130, filed on May 10, 2019, both of which are incorporated herein by reference in their entirety.

BACKGROUND

Polyolefins are a class of polymers derived from simple olefins. Known methods of making polyolefins involve the use of Ziegler-Natta polymerization catalysts. These catalysts polymerize olefin monomers using a transition metal halide to provide a polymer with various types of stereochemical configurations.

One type of Ziegler-Natta catalyst system comprises a solid catalyst component, constituted by a magnesium halide on which are supported a titanium compound and an internal electron donor compound. In order to maintain high selectivity for an isotactic polymer product, internal electron donor compounds are added during catalyst synthesis. The internal donor can be of various types. Conventionally, when a higher crystallinity of the polymer is required, an external donor compound is also added during the polymerization reaction.

During the past 30 years, numerous supported Ziegler-Natta catalysts have been developed which afford a much higher activity in olefin polymerization reactions and much higher content of crystalline isotactic fractions in the polymers they produce. With the development of internal and external electron donor compounds, polyolefin catalyst systems are continuously renovated.

One problem encountered with newly developed Ziegler-Natta catalyst, particularly non-phthalate catalyst, is that the catalyst produces a significantly high catalyst activity immediately during the polymerization process. The high catalyst activity can lead to a rapid temperature increase in the center of the catalyst particles. In some applications, the surface area of the catalyst particles is not sufficient to allow heat to dissipate causing the particles to break up or otherwise degrade.

In order to control catalyst kinetics, some polymerization processes, namely slurry phase polymerization processes or bulk phase polymerization processes, are equipped with a prepolymerization line or reactor. In these processes, a polyolefin prepolymerization step is carried out prior to the catalyst entering the main polymerization reactor. During prepolymerization, small amounts of olefin monomer are polymerized into a polyolefin under mild conditions and at low reaction rates. Consequently, small amounts of polyolefin polymer are produced and combined with the catalyst particles without damaging the catalyst particles. The prepolymerized catalyst is then fed into the main reaction chamber in order to produce the polyolefin polymer under normal reaction conditions. The prepolymerization step has been found to control initial catalyst kinetics for preventing catalyst damage.

Although using a prepolymerization reactor can provide various benefits, many polyolefin polymerization processes do not contain a prepolymerization reactor and are not amendable to design changes to include a prepolymerization step. For instance, many gas phase polyolefin reactors do not include a prepolymerization reactor and are not well suited to containing a prepolymerization reactor. These processes are particularly problematic in that the catalyst particles are directly injected into a hot fluidized bed. Thus in many gas phase reactors, one reoccurring problem is the ability to control catalyst reaction rates and activity, especially at the beginning of the polymerization process.

In view of the above, in the past, catalyst manufacturers have attempted to prepolymerize or activate the catalyst prior to shipping the catalyst to a customer for use in a polymerization process. Prepolymerizing the catalyst outside of the polymerization process, however, has met with little success. For instance, activating the catalyst for later use in a polymerization process can render the catalyst unstable. The prepolymerized catalyst, for instance, can degrade or dramatically decrease in catalyst activity when used later. Thus, in the past, prepolymerized catalyst were stored or shipped at low temperature which increased the complexity of delivery and storage and increased the cost of using the catalyst.

In view of the above, a prepolymerized Ziegler-Natta catalyst is needed that is stable at ambient temperatures for extended periods of time. A need also exists for an improved prepolymerized or activated catalyst for use in gas phase polyolefin polymer processes that can control reaction kinetics initially to prevent against catalyst breakup or destruction but yet have sufficient activity so as to not increase the overall polymerization reaction times.

SUMMARY

The present disclosure is generally directed to a non-phthalate, high activity, activated catalyst component for polyolefin production that offers improved control over reaction kinetics. The polymers produced from the activated catalyst component can have improved flow properties and processability. These improvements may be attributed to improved polymer morphology. The activated solid catalyst component of the present disclosure is a Ziegler-Natta catalyst that not only offers high catalyst activity without initial heat buildup sufficient to cause catalyst breakup, but has also been found to have an extended catalyst lifetime. It was unexpectedly discovered that the active solid catalyst component of the present disclosure not only displays stability for several months without changing catalyst activity, but also has been found to display improved catalyst morphology that translates into improved polymer morphology.

For example, in one embodiment, the present disclosure is directed to an activated solid catalyst component for olefin polymerization. The activated solid catalyst component includes the reaction product of:
  (a) a halide-containing magnesium compound;
  (b) a titanium compound being present in the catalyst component in an oxidation state of +3; other titanium compounds can also be present having an oxidation state of +2 and/or +4;
  (c) an organosilicon compound containing Si—O groups;
  (d) an alkylaluminum compound; and
  (e) at least one internal electron donor optionally including a supportive donor, the at least one internal electron donor being present in the catalyst component in an amount from about 0.05% to about 15% by weight in one aspect and in another aspect in an amount from about 1% to about 20% by weight.

The activated solid catalyst component further includes a polymer formed from an alpha-olefin having the formula:

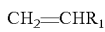

wherein $R_1$ comprises hydrogen, or a C1 to C7 alkyl group, and being present in the catalyst component in an amount from about 0.3 g to about 200 g of polymer per gram of catalyst component.

The polyolefin formed with the activated solid catalyst component can be, for instance, a polyethylene or a polypropylene, and can become integrated into the catalyst particles. For example, in one embodiment, the prepolymerized polyolefin polymer can at least partially coat the catalyst particles.

The halide-containing magnesium compound can comprise magnesium chloride. The organosilicon compound can be a silane, siloxane or polysiloxane having the following chemical structure:

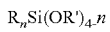

wherein:
each R is H, alkyl, or aryl;
each R' is H, alkyl, aryl, or a $SiR_n(OR')_{3-n}$; and
n is 0, 1, 2, or 3.

The supportive electron donor, in one embodiment, can comprise a benzoate. The benzoate may have the following formula:

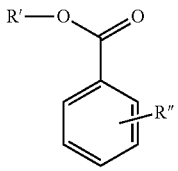

wherein R' comprises an alkyl group, a cyclic group, an aryl group having from 1 to 20 carbon atoms, a heteroatom or a combination thereof, and wherein R'' comprises one or more substituted groups, each substituted group can comprise independently hydrogen, an alkyl group, a cyclic group, an aryl group having from 1 to 20 carbon atoms, a heteroatom, or a combination thereof.

The internal electron donor can have the following formula:

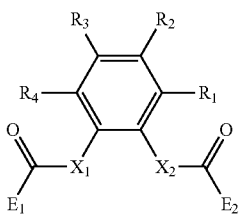

where R1-R4 are the same or different and each R1-R4 is selected from the group consisting of hydrogen, a substituted hydrocarboyl group having 1 to 20 carbon atoms, an unsubstituted hydrocarobyl having 1 to 20 carbon atoms, a substituted or unsubstituted aryl group having 6 to 20 carbons, an alkoxy group having 1 to 20 carbon atoms, a heteroatom and combinations thereof and at least one of R1-R4 is not hydrogen; where $E_1$ and $E_2$ are the same or different and selected from the group consisting of an alkyl having 1 to 20 carbon atoms, including cycloalkyl groups having 5 to 10 carbon atoms, a substituted alkyl having 1 to 20 carbon atoms, an aryl having 6 to 20 carbon atoms, a substituted aryl having 6 to 20 carbon atoms, or an inert functional group having 1 to 20 carbon atoms and optionally containing heteroatoms; and wherein $X_1$ and $X_2$ are each O, S, an alkyl group, or $NR_5$ and wherein $R_5$ is a hydrocarbyl group having 1 to 20 carbon atoms or is hydrogen; or The internal electron donor, in one aspect, can have one of the following formulas:

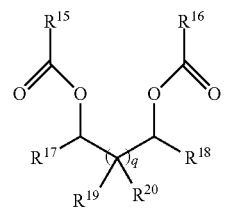

wherein:
each of $R^{15}$ through $R^{20}$ are independently H, F, Cl, Br, I, alkyl, cycloalkyl, cycloalkylalkyl, aryl, aralkyl, heterocyclyl, heterocyclylalkyl, heteroaryl, or heteroarylalkyl; and
q is an integer from 0 to 12; or

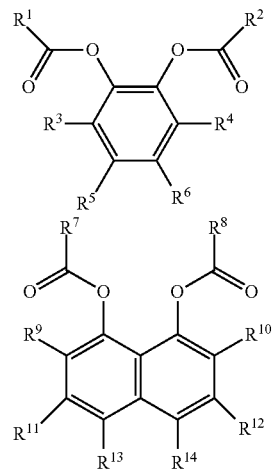

wherein:
each of $R^1$ through $R^{14}$ are independently H, F, Cl, Br, I, alkyl, cycloalkyl, cycloalkylalkyl, aryl, aralkyl, heterocyclyl, heterocyclylalkyl, heteroaryl, or heteroarylalkyl; and
q is an integer from 0 to 12.

In general, the catalyst component is activated by combining the catalyst component with the alkyl-aluminum compound, which may comprise triethylaluminum. After being activated, the solid catalyst component contains titanium and carbon bonds. In one embodiment, the activated solid catalyst component is formulated such that the molar ratio between aluminum and titanium is from about 0.1 to 200, such as from about 0.5 to 20 and the silicone to titanium molar ratio is from about 0.05 to 10, such as from about 0.1 to 6. The resulting activated solid catalyst component can be in the form of particles having an average particle size of from about 5 microns to about 300 microns, such as from about 5 microns to about 70 microns.

In one embodiment, the activated solid catalyst component can further contain an organic phosphorus compound. The organic phosphorus compound, for instance, may comprise a phosphate acid ester. The activated solid catalyst component can also contain an activity limiting agent. The activity limiting agent can comprise a C4 to C30 aliphatic acid ester, a diether, or a poly(alkene glycol) ester of a C4 to C30 aliphatic acid. Examples of active limiting agents include isopropyl myristate, pentylvalerate, or mixtures thereof.

The present disclosure is also directed to a process for producing an activated solid catalyst. The process, in one embodiment, can comprise the following:

a. forming a catalyst precursor by reacting a magnesium alkoxide (Mg(OR)$_n$X$_{2-n}$) or magnesium alcholate (MgX$_2$mR'OH) with Ti(OR)gX4-g wherein X is Br, Cl, or I; n is 1, 2; m is 0.5-10; and g is 0, 1, 2, 3, or 4; and R, R', R" are independently C1-C10 alkyl, such as a C1-C4 alkyl, the catalyst precursor containing a supportive electron donor and an internal electron donor;

b. reacting the product obtained from (a) with a trialkyl aluminum compound in the presence of an organosilicon compound having the following formula R$_2$nSi(OR$_3$')4-n, wherein R$_2$ is H, alkyl, or aryl; each R$_3$' is alkyl, or aryl; n is 0, 1, 2 or 3;

c. reacting the product obtained in (b) with an olefin having a formula CH2=CHR' wherein R'=H, or a C1-C7 alkyl group and polymerizing the olefin to form a polymer coating on the solid catalyst component particles, the olefin polymer being present in an amount of less than 50 g per 1 g of the activated solid catalyst component.

d. isolating an activated catalyst component.

In one embodiment, the catalyst precursor is an alcohol adduct of anhydrous magnesium chloride. The anhydrous magnesium chloride adduct is generally defined as MgCl$_2$-nROH where n has a range of 1.5-6.0, preferably 2.5-4.0, and most preferably 2.8-3.5 moles total alcohol. ROH is a C$_1$-C$_4$ alcohol, linear or branched, or mixture of alcohol. Preferably ROH is ethanol or a mixture of ethanol and a higher alcohol. If ROH is a mixture, the mole ratio of ethanol to higher alcohol is at least 80:20, preferably 90:10, and most preferably at least 95:5.

In one embodiment, a substantially spherical MgCl$_2$-nEtOH adduct may be formed by a spray crystallization process. In one, embodiment the spherical MgCl$_2$ precursor has an average particle size (Malvern d$_{50}$) of between about 15-150 microns, preferably between 20-100 microns, and most preferably between 35-85 microns.

The present disclosure is also directed to a process for producing olefin polymers. The process includes polymerizing an olefin in the presence of an activated solid catalyst component in a gas phase polymerization reactor in production of homo- and copolymers. The activated solid catalyst component can be as described above. The resulting polymer produced by the process can have improved morphology. Specifically, the polymer produced with the activated catalyst can have a very high bulk density (greater than about 0.45 g/cc, such as greater than about 0.50 g/cc) and excellent flow properties. In addition, the polymer particles can be substantially spherical. For instance, the particles can have a B/L3 of greater than about 0.65, such as greater than about 0.7, such as greater than about 0.77. The polyolefin particles may comprise polypropylene particles. The polyolefin particles can also have a bulk density of greater than about 0.4 g/cc, such as greater than about 0.5 g/cc, and generally less than about 0.8 g/cc.

Other features and aspects of the present disclosure are discussed in greater detail below.

BRIEF DESCRIPTION OF THE FIGURES

A full and enabling disclosure of the present disclosure is set forth more particularly in the remainder of the specification, including reference to the accompanying figures, in which.

DETAILED DESCRIPTION

Figure 1:
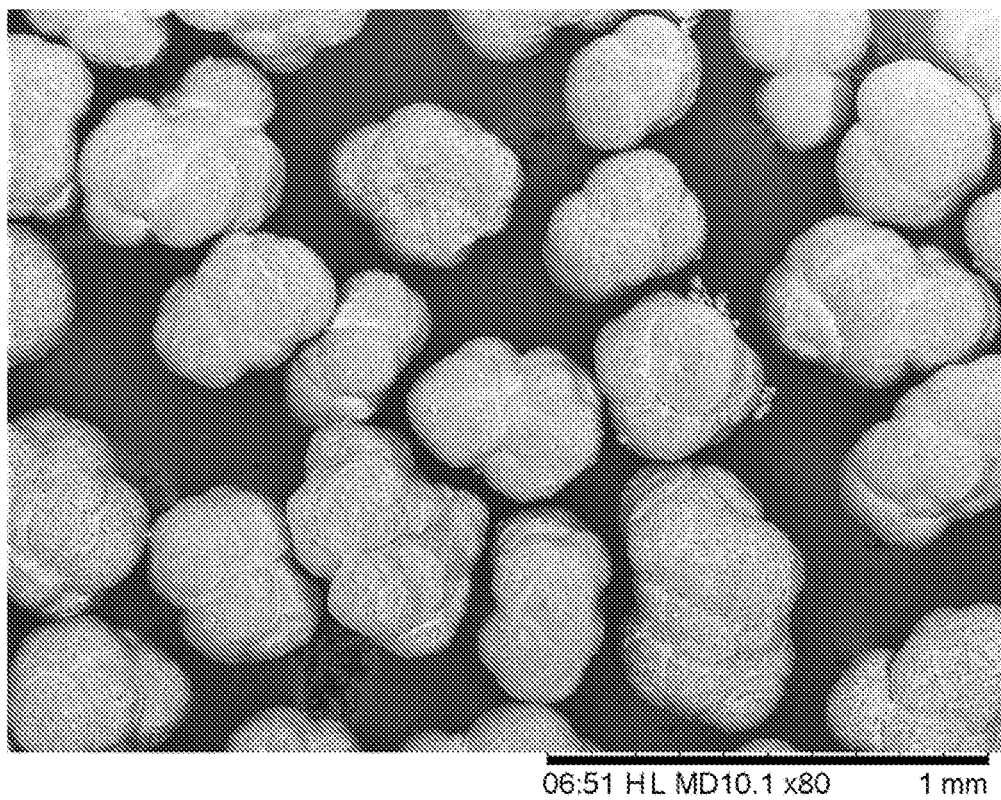
FIG. 1 is a SEM image of polypropylene particles produced in Example 4.

Before describing several exemplary embodiments, it is to be understood that the invention is not limited to the details of construction or process steps set forth in the following description. The invention is capable of other embodiments and of being practiced or being carried out in various ways.

In general, the present disclosure is directed to catalyst systems for producing polyolefin polymers, particularly polypropylene polymers. The present disclosure is also directed to methods of polymerizing and copolymerizing olefins using the catalyst system. In general, the catalyst system of the present disclosure is directed to the use of an activated solid catalyst component. The solid catalyst component is "activated" by being exposed to an activator, such as an aluminum compound, that forms titanium and carbon bonds within the catalyst component that can serve as active sites for catalyzing the production of polyolefin polymers from a polyolefin monomer. In one embodiment, the activated solid catalyst component is activated in the presence of small amounts of an alpha-olefin monomer for forming a prepolymerized, activated solid catalyst component.

The activated catalyst component, which comprises a Ziegler-Natta catalyst, is prepared by combining a magnesium compound, such as magnesium chloride or a magnesium alkoxide, with a titanium compound in the presence of a supportive electron donor and at least one internal electron donor. The supportive electron donor, for instance, may be an akylbenzoate and the internal electron donor may be an aryl diester. The formed catalyst support is then combined with an alkyl aluminum compound in the presence of an organosilicon compound in order to activate the solid catalyst component. An alpha-olefin can also be present that polymerizes and becomes incorporated into the activated solid catalyst component. The formed olefin polymer, for instance, can be present in the catalyst component in an amount of from about 0.3 g to about 50 g of polymer per gram of catalyst component.

The prepolymerized and activated solid catalyst component of the present disclosure can offer various advantages and benefits. For example, although the activated solid catalyst component displays high catalyst activity such as greater than 60 g/kg, the activated catalyst component does not over heat when fed to a polymerization reactor in the presence of an olefin monomer and under normal operating conditions. For example, the activated solid catalyst component of the present disclosure has been found to efficiently polymerize propylene monomers even in gas phase reactors without breaking apart due to lack of heat transfer control. The activated solid catalyst component has also unexpectedly been found to be extremely stable. The activated catalyst component, for instance, can be stable for at least 3 months, such as least 5 months, without losing any significant catalyst activity and when stored at ambient conditions. Thus, a catalyst producer can activate the solid catalyst component, ship the activated solid catalyst component to a polymer manufacturer for being injected into a polymerization reactor that may not be equipped with a prepolymerization reactor or line. In this regard, the activated solid catalyst component of the present disclosure is particularly well suited for use in gas phase reactors wherein the catalyst component can be directly injected into a hot fluidized bed for producing a polyolefin polymer.

The activated solid catalyst component of the present disclosure was also found to unexpectedly produce polyolefin polymers with improved morphology due to the catalyst morphology. Catalyst and polymer morphology characteristics include, for instance, average particle size, particle size distribution, particle shape, and surface texture. Catalyst morphology characteristics can directly influence the morphology of polymer particles produced from the catalyst. Polyolefin polymers made from the activated solid catalyst component, for instance, can be produced having substantially spherical particles that display an optimum particle size and a relatively narrow particle size distribution. The polymer particles can have an improved and relatively high bulk density. Due to the improved polymer morphology, the polymer particles are much easier to handle. The polymer particles have excellent flow properties and are easy to process. For instance, the polymer particles are easier to remove from the reactor, easier to transport, and are easier to package and ship. In addition, the improved particle properties also prevent against fouling within the reactor equipment.

For example, polymer powders made according to the present disclosure can have an average particle size of greater than about 5 microns, such as greater than about 10 microns, such as greater than about 20 microns, such as greater than about 30 microns, such as greater than about 40 microns. The average particle size of the polymer particles can generally be less than about 300 microns, such as less than about 200 microns, such as less than about 120 microns, such as less than about 70 microns. As described above, the polymer particles can be substantially spherical. For instance, the polymer particles can have a B/L3 of greater than about 0.65, such as greater than about 0.7, such as greater than about 0.75, such as even greater than about 0.77 and generally less than 1. Due to the particle morphology, polymer resins made according to the present disclosure can also have increased bulk density and thus good flow properties. The bulk density of the polymer particles, for instance, can be greater than about 0.4 g/cc, such as greater than about 0.45 g/cc, such as greater than about 0.5 g/cc. The bulk density is generally less than about 0.58 g/cc.

The method of preparing the activated solid catalyst component of the present disclosure generally includes the step of treating a non-phthalate, Ziegler-Natta catalyst component with an activator, such as an aluminum compound, in the presence of a selectivity control agent or external electron donor, which may comprise an organosilicon compound, and optionally an activity limiting agent, followed by adding controlled amounts of an olefin monomer, such a propylene.

The catalyst platform that is activated in accordance with the present disclosure can vary depending upon the particular embodiment and the desired result. In general, the catalyst precursor platform or catalyst component includes a magnesium compound and a titanium compound combined with supportive electron donor and at least one internal electron donor.

In one embodiment, the catalyst precursor component is a mixed magnesium/titanium compound that can have the following formula $Mg_dTi(OR^e)fX_g$ wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently chlorine, bromine or iodine, preferably chlorine; d is 0.5 to 56, or 2 to 4; f is 2 to 116 or 5 to 15; and g is 0.5 to 116, or 1 to 3. The catalyst precursor component is prepared by controlled precipitation through removal of an alcohol from the reaction mixture used in their preparation. In one embodiment, a reaction medium comprises a mixture of an aromatic liquid, especially a chlorinated aromatic compound, such as chlorobenzene, with an alkanol, such as ethanol. Suitable halogenating agents include titanium tetrabromide, titanium alkoxide, titanium tetrachloride or titanium trichloride. Removal of the alkanol from the solution used in the halogenation, results in precipitation of the solid catalyst precursor component.

For example, in one embodiment, the catalyst precursor component comprises the reaction product of a magnesium alkoxide, such as magnesium ethylene oxide, with a mixture of o-cresol, titanium ethoxide, titanium tetrachloride, and ethanol in the presence of an internal electron donor. During the process, in one embodiment, a supportive electron donor can be formed as a side product and incorporated into the catalyst. The supportive electron donor, for instance, may comprise an alkylbenzoate, such as ethylbenzoate. The supportive electron donor can be incorporated into the inactivated catalyst component in an amount from about 0.01% to about 5% by weight, such as from about 0.5% to about 5% by weight, such as in an amount from about 1% to about 4% by weight. In addition, the supportive donor can be formed as a side product in situ by a reaction of the internal donor with the reaction mixture.

In another embodiment, the catalyst precursor component can be formed from a magnesium alcholate, a titanium halide, a supportive electron donor, and an internal electron donor. For example, in one embodiment, a solid magnesium alcholate is treated with the titanium halide removing alcohol. The internal and supportive donors can be added at different steps of the process vary the solid catalyst component properties.

For example, the catalyst precursor can be an alcohol adduct of anhydrous magnesium chloride. The anhydrous magnesium chloride adduct is generally defined as $MgCl_2$-nROH where n has a range of 1.5-6.0, preferably 2.5-4.0, and most preferably 2.8-3.5 moles total alcohol. ROH is a $C_1$-$C_4$ alcohol, linear or branched, or mixture of alcohol. Preferably ROH is ethanol or a mixture of ethanol and a higher alcohol. If ROH is a mixture, the mole ratio of ethanol to higher alcohol is at least 80:20, preferably 90:10, and most preferably at least 95:5.

In one embodiment, a substantially spherical MgCl$_2$-nEtOH adduct may be formed by a spray crystallization process. In one, embodiment the spherical MgCl$_2$ precursor has an average particle size (Malvern d$_{50}$) of between about 15-150 microns, preferably between 20-100 microns, and most preferably between 35-85 microns.

In another embodiment, the catalyst precursor component can be formed from a magnesium moiety, a titanium moiety, an epoxy compound, an organic phosphorus compound, an organosilicon compound, a supportive electron donor, and an internal electron donor. For example, in one embodiment, a halide-containing magnesium compound can be dissolved in a mixture that includes an epoxy compound, an organic phosphorus compound, and a hydrocarbon solvent. The resulting alkoxide solution can be treated with a titanium compound in the presence of an organosilicon compound, a supportive electron donor, and internal electron donor to form a solid precipitate. The solid precipitate can then be treated with further amounts of a titanium compound. The titanium compound used to form the catalyst can have the following chemical formula:

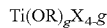

where each R is independently a C$_1$-C$_4$ alkyl; X is Br, Cl, or I; and g is 0, 1, 2, 3, or 4.

In some embodiments, the organosilicon is a monomeric or polymeric compound. The organosilicon compound may contain —Si—O—Si— groups inside of one molecule or between others. Other illustrative examples of an organosilicon compound include polydialkylsiloxane and/or tetraalkoxysilane. Such compounds may be used individually or as a combination thereof. The organosilicon compound may be used in combination with a supportive electron donor and an internal electron donor.

Examples of the halide-containing magnesium compounds include magnesium chloride, magnesium bromide, magnesium iodide, and magnesium fluoride. In one embodiment, the halide-containing magnesium compound is magnesium chloride.

Illustrative of the epoxy compounds include, but are not limited to, glycidyl-containing compounds of the Formula:

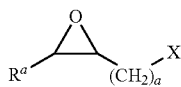

wherein "a" is from 1, 2, 3, 4, or 5, X is F, Cl, Br, I, or methyl, and R$^a$ is H, alkyl, aryl, or cyclyl. In one embodiment, the alkylepoxide is epichlorohydrin. In some embodiments, the epoxy compound is a haloalkylepoxide or a nonhaloalkylepoxide.

According to some embodiments, the epoxy compound is selected from the group consisting of ethylene oxide; propylene oxide; 1,2-epoxybutane; 2,3-epoxybutane; 1,2-epoxyhexane; 1,2-epoxyoctane; 1,2-epoxydecane; 1,2-epoxydodecane; 1,2-epoxytetradecane; 1,2-epoxyhexadecane; 1,2-epoxyoctadecane; 7,8-epoxy-2-methyloctadecane; 2-vinyl oxirane; 2-methyl-2-vinyl oxirane; 1,2-epoxy-5-hexene; 1,2-epoxy-7-octene; 1-phenyl-2,3-epoxypropane; 1-(1-naphthyl)-2,3-epoxypropane; 1-cyclohexyl-3,4-epoxybutane; 1,3-butadiene dioxide; 1,2,7,8-diepoxyoctane; cyclopentene oxide; cyclooctene oxide; α-pinene oxide; 2,3-epoxynorbornane; limonene oxide; cyclodecane epoxide; 2,3,5,6-diepoxynorbornane; styrene oxide; 3-methylstyrene oxide; 1,2-epoxybutylbenzene; 1,2-epoxyoctylbenzene; stilbene oxide; 3-vinylstyrene oxide; 1-(1-methyl-1,2-epoxyethyl)-3-(1-methylvinyl benzene); 1,4-bis(1,2-epoxypropyl)benzene; 1,3-bis(1,2-epoxy-1-methylethyl)benzene; 1,4-bis(1,2-epoxy-1-methylethyl)benzene; epifluorohydrin; epichlorohydrin; epibromohydrin; hexafluoropropylene oxide; 1,2-epoxy-4-fluorobutane; 1-(2,3-epoxypropyl)-4-fluorobenzene; 1-(3,4-epoxybutyl)-2-fluorobenzene; 1-(2,3-epoxypropyl)-4-chlorobenzene; 1-(3,4-epoxybutyl)-3-chlorobenzene; 4-fluoro-1,2-cyclohexene oxide; 6-chloro-2,3-epoxybicyclo[2.2.1]heptane; 4-fluorostyrene oxide; 1-(1,2-epoxypropyl)-3-trifluorobenzene; 3-acetyl-1,2-epoxypropane; 4-benzoyl-1,2-epoxybutane; 4-(4-benzoyl)phenyl-1,2-epoxybutane; 4,4'-bis(3,4-epoxybutyl)benzophenone; 3,4-epoxy-1-cyclohexanone; 2,3-epoxy-5-oxobicyclo[2.2.1]heptane; 3-acetylstyrene oxide; 4-(1,2-epoxypropyl)benzophenone; glycidyl methyl ether; butyl glycidyl ether; 2-ethylhexyl glycidyl ether; allyl glycidyl ether; ethyl 3,4-epoxybutyl ether; glycidyl phenyl ether; glycidyl 4-tert-butylphenyl ether; glycidyl 4-chlorophenyl ether; glycidyl 4-methoxyphenyl ether; glycidyl 2-phenylphenyl ether; glycidyl 1-naphthyl ether; glycidyl 2-phenylphenyl ether; glycidyl 1-naphthyl ether; glycidyl 4-indolyl ether; glycidyl N-methyl-α-quinolon-4-yl ether; ethyleneglycol diglycidyl ether; 1,4-butanediol diglycidyl ether; 1,2-diglycidyloxybenzene; 2,2-bis(4-glycidyloxyphenyl)propane; tris(4-glycidyloxyphenyl)methane; poly(oxypropylene)triol triglycidyl ether; a glycidic ether of phenol novolac; 1,2-epoxy-4-methoxycyclohexane; 2,3-epoxy-5,6-dimethoxybicyclo[2.2.1]heptane; 4-methoxystyrene oxide; 1-(1,2-epoxybutyl)-2-phenoxybenzene; glycidyl formate; glycidyl acetate; 2,3-epoxybutyl acetate; glycidyl butyrate; glycidyl benzoate; diglycidyl terephthalate; poly(glycidyl acrylate); poly(glycidyl methacrylate); a copolymer of glycidyl acrylate with another monomer; a copolymer of glycidyl methacrylate with another monomer; 1,2-epoxy-4-methoxycarbonylcyclohexane; 2,3-epoxy-5-butoxycarbonylbicyclo[2.2.1]heptane; ethyl 4-(1,2-epoxyethyl)benzoate; methyl 3-(1,2-epoxybutyl)benzoate; methyl 3-(1,2-epoxybutyl)-5-pheylbenzoate; N,N-glycidylmethylacetamide; N,N-ethylglycidylpropionamide; N,N-glycidylmethylbenzamide; N-(4,5-epoxypentyl)-N-methylbenzamide; N,N-diglycylaniline; bis(4-diglycidylaminophenyl)methane; poly(N,N-glycidylmethylacrylamide); 1,2-epoxy-3-(diphenylcarbamoyl)cyclohexane; 2,3-epoxy-6-(dimethylcarbamoyl)bicycle[2.2.1]heptane; 2-(dimethylcarbamoyl)styrene oxide; 4-(1,2-epoxybutyl)-4'-(dimethylcarbamoyl)biphenyl; 4-cyano-1,2-epoxybutane; 1-(3-cyanophenyl)-2,3-epoxybutane; 2-cyanostyrene oxide; and 6-cyano-1-(1,2-epoxy-2-phenylethyl)naphthalene.

As an example of the organic phosphorus compound, phosphate acid esters such as trialkyl phosphate acid ester may be used. Such compounds may be represented by Formula:

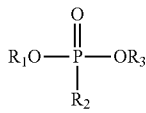

wherein R$_1$, R$_2$, and R$_3$ are each independently selected from the group consisting of methyl, ethyl, and linear or branched (C$_3$-C$_{10}$) alkyl groups. In one embodiment, the trialkyl phosphate acid ester is tributyl phosphate acid ester.

The catalyst component may be converted to a solid catalyst by way of halogenation. Halogenation includes contacting the catalyst component with a halogenating agent in the presence of the supportive electron donor and/or internal electron donor. Halogenation converts the magnesium moiety present in the catalyst component into a magnesium halide support upon which the titanium moiety (such as a titanium halide) is deposited. Not wishing to be bound by any particular theory, it is believed that during halogenation the internal electron donor (1) regulates the position of titanium on the magnesium-based support, (2) facilitates conversion of the magnesium and titanium moieties into respective halides and (3) regulates the crystallite size of the magnesium halide support during conversion.

As described above, at least one internal electron donor is present during the synthesis of the catalyst support. An internal electron donor is a compound added or otherwise formed during formation of the catalyst composition that donates at least one pair of electrons to one or more metals present in the resultant catalyst support. In one embodiment, at least two internal electron donors are present during the synthesis of the catalyst support. A supportive donor may also be present. The supportive donor is a reagent added in the support synthesis and/or formed during the process of constructing the catalyst that binds to the magnesium surface and remains in the catalyst support, similar to the internal electron donor. The supportive donor is usually smaller (less bulky) and produces a weaker coordination with the catalyst support than the internal electron donor. In this regard, although unknown, it is believed that the supportive donor is partially removed from the catalyst support when contacted with an activation agent such as an aluminum compound. The supportive donor is believed to be preferentially removed from the catalyst support during activation in a manner that maintains greater amounts of other internal electron donors within the catalyst composition. For instance, the supportive donor can be used to maintain greater amounts of the internal electron donor, which may be an aryl diester. Because the aryl diester stays bonded to the catalyst support in greater amounts due to the presence of the supportive donor, it is believed that the catalyst when activated and prepolymerized maintains a high level of catalyst activity over time allowing the resulting prepolymer catalyst to be stored prior to use. Thus, the supportive donor operates like an internal electron donor but is removed from the catalyst support in greater amounts during activation of the catalyst in comparison to the internal electron donor. In this manner, the supportive donor is a secondary internal electron donor that protects the primary internal electron donor. Further, it is believed that the supportive donor is incorporated into the catalyst support during synthesis and later partially removed from the catalyst support without in any way affecting the metals contained in the catalyst support. It is believed that during the activation of the catalyst component with alkyl aluminium the supportive electron donor is at least partially replaced by an external electron donor, such as RnSi(OR')4-n, resulting in an active catalyst component that is stable over a long period of time.

The catalyst component morphology and catalyst performances are sufficiently controlled by addition of the supportive electron donor (or donors). The supportive electron donor is an organic compound containing oxygen atom and has ability to coordinate to magnesium atom of magnesium in "oil phase-droplets" and allows to control the precipitation process of the solid catalyst component with desired morphology.

In one embodiment, the supportive electron donor only controls the precipitation process and catalyst component morphology and is not incorporated in the catalyst component.

In other embodiment, the supportive electron donor controls the precipitation process and catalyst component morphology and is incorporated in the catalyst component. Therefore, the supportive electron donor and the electron donor both define the catalyst performance in polymerization process. The supportive electron donors are usually weaker than the electron donors.

The combination of the organosilicon compound and the supportive electron donor during the precipitation of the solid catalyst intermediate allow to make the catalyst component with desired granular or spherical shape morphology.

The granular catalyst component morphology can be prepared with raspberry shape, rounded raspberry shape, rounded shape and substantially spherical shape by variation of organosilicon compounds, supportive electron donors and condition of the precipitation the solid catalyst intermediate. The particle sizes of the catalyst component are from about 5 microns to about 70 microns (on a 50% by volume basis) and depends on condition of the precipitation (temperature, agitation speed, solvent and others) and type and amount of the supportive donor.

In an embodiment, the halogenating agent is a titanium halide having the formula $Ti(OR^e)_fX_h$, wherein $R^e$ and X are defined as above, f is an integer from 0 to 3; h is an integer from 1 to 4; and f+h is 4. In an embodiment, the halogenating agent is $TiCl_4$. In a further embodiment, the halogenation is conducted in the presence of a chlorinated or a non-chlorinated aromatic liquid, such as dichlorobenzene, o-chlorotoluene, chlorobenzene, benzene, toluene, or xylene. In yet another embodiment, the halogenation is conducted by use of a mixture of halogenating agent and chlorinated aromatic liquid comprising from 40 to 60 volume percent halogenating agent, such as $TiCl_4$.

The reaction mixture can be heated during halogenation. The catalyst component and halogenating agent are contacted initially at a temperature of less than about 10° C., such as less than about 0° C., such as less than about −10° C., such as less than about −20° C., such as less than about −30° C. The initial temperature is generally greater than about −50° C., such as greater than about −40° C. The mixture is then heated at a rate of 0.1 to 10.0° C./minute, or at a rate of 1.0 to 5.0° C./minute. The internal electron donor may be added later, after an initial contact period between the halogenating agent and catalyst component. Temperatures for the halogenation are from 20° C. to 150° C. (or any value or subrange therebetween), or from 0° C. to 120° C. Halogenation may be continued in the substantial absence of the internal electron donor for a period from 5 to 60 minutes, or from 10 to 50 minutes.

The manner in which the catalyst component, the halogenating agent, the supportive electron donor, and the internal electron donor are contacted may be varied in synthesizing the catalyst precursor or during the activation process by alkyl aluminum. In an embodiment, the catalyst component is first contacted with a mixture containing the halogenating agent and a chlorinated aromatic compound. The resulting mixture is stirred and may be heated if desired. Next, the supportive electron donor and/or internal electron donor is added to the same reaction mixture without isolating or recovering of the precursor. The foregoing process may be conducted in a single reactor with addition of the various ingredients controlled by automated process controls.

In one embodiment, the catalyst component is contacted with the internal electron donor before reacting with the halogenating agent.

Contact times of the catalyst component with the supportive electron donor and/or internal electron donor are at least 10 minutes, or at least 15 minutes, or at least 20 minutes, or at least 1 hour at a temperature from at least −30° C., or at least −20° C., or at least 10° C. up to a temperature of 150° C., or up to 120° C., or up to 115° C., or up to 110° C.

In one embodiment, the catalyst component, the supportive electron donor, the internal electron donor, and the halogenating agent are added simultaneously or substantially simultaneously. The halogenation procedure may be repeated one, two, three, or more times as desired.

After the foregoing halogenation procedure, the resulting solid catalyst composition is separated from the reaction medium employed in the final process, by filtering for example, to produce a moist filter cake. The moist filter cake may then be rinsed or washed with a liquid diluent to remove unreacted $TiCl_4$ and may be dried to remove residual liquid, if desired. Typically the resultant solid catalyst composition is washed one or more times with a "wash liquid," which is a liquid hydrocarbon such as an aliphatic hydrocarbon such as isopentane, isooctane, isohexane, hexane, pentane, or octane. The solid catalyst composition then can be separated and dried or slurried in a hydrocarbon, especially a relatively heavy hydrocarbon such as mineral oil for further storage or use.

Various different types of supportive electron donors and internal electron donors may be incorporated into the solid catalyst component of the present disclosure. Examples of supportive electron donors include methyl formate; ethyl acetate; vinyl acetate; propyl acetate; octyl acetate; cyclohexyl acetate; ethyl propionate; methyl butyrate; ethyl valerate; ethyl stearate; methyl chloroacetate; ethyl dichloroacetate; methyl methacrylate; ethyl crotonate; dibutyl maleate; diethyl butylmalonate; diethyl dibutylmalonate; ethyl cyclohexanecarboxylate; diethyl 1,2-cyclohexanedicarboxylate; di-2-ethylhexyl 1,2-cyclohexanedicarboxylate; methyl benzoate; ethyl benzoate; propyl benzoate; butyl benzoate; octyl benzoate; cyclohexyl benzoate; phenyl benzoate; benzyl benzoate; methyl toluate; ethyl toluate; amyl toluate; ethyl ethylbenzoate; methyl anisate; ethyl anisate; ethyl ethoxybenzoate; γ-butyrolactone; S-valerolactone; coumarine; phthalide; ethylene carbonate; ethyl silicate; butyl silicate; vinyltriethoxysilane; phenyltriethoxysilane; diphenyldiethoxysilane; diethyl 1,2-cyclohexanecarboxylate; diisobutyl 1,2-cyclohexanecarboxylate; diethyl tetrahydrophthalate and nadic acid; diethyl ester; diethyl naphthalenedicarboxylate; dibutyl naphthlenedicarboxylate; triethyl trimellitate and dibutyl trimellitate; 3,4-furanedicarboxylic acid esters; 1,2-diacetoxybenzene; 1-methyl-2,3-diacetoxybenzene; 2-methyl-2,3-diacetoxybenzene; 2,8-diacetoxynaphthalene; ethylene glycol dipivalate; butanediol pivalate; benzoylethyl salicylate; acetylisobutyl salicylate; acetylmethyl salicylate; diethyl adipate; diisobutyl adipate; diisopropyl sebacate; di-n-butyl sebacate; di-n-octyl sebacate; or di-2-ethylhexyl sebacate. In some embodiments, the first non-phthalate donor is methyl formate, butyl formate, ethyl acetate, vinyl acetate, propyl acetate, octyl acetate, cyclohexyl acetate, ethyl propionate, methyl butyrate, ethyl butyrate, isobutyl butyrate, ethyl valerate, ethyl stearate, methyl chloroacetate, ethyl dichloroacetate, ethyl acrylate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, ethyl p-methoxybenzoate, methyl p-methyl benzoate, ethyl p-t-butyl benzoate, ethyl naphthoate, methyl toluate, ethyl toluate, amyl toluate, ethyl ethyl benzoate, methyl anisate, ethyl anisate, or ethyl ethoxybenzoate.

In one embodiment, the supportive electron donor has the following formula:

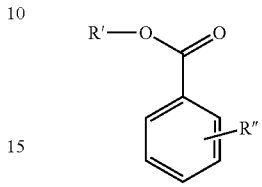

wherein R' comprises an alkyl group, a cyclic group, an aryl group having from 1 to 20 carbon atoms, a heteroatom or a combination thereof, and wherein R" comprises hydrogen or one or more substituted groups, each substituted group can comprise independently an alkyl group, a cyclic group, an aryl group having from 1 to 20 carbon atoms, a heteroatom, or a combination thereof. For example, in one embodiment, the supportive electron donor comprises ethylbenzoate.

Various different types of internal electron donors may be incorporated into the solid catalyst component. In one embodiment, the internal electron donor is an aryl diester, such as a phenylene-substituted diester. In one embodiment, the internal electron donor may have the following chemical structure:

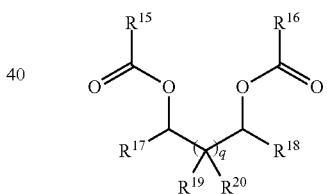

wherein:

each of R15 through R20 are independently H, F, Cl, Br, I, alkyl, cycloalkyl, cycloalkylalkyl, aryl, aralkyl, heterocyclyl, heterocyclylalkyl, heteroaryl, or heteroarylalkyl; and q is an integer from 0 to 12.

In one embodiment, the internal electron donor may have one of the following chemical structures:

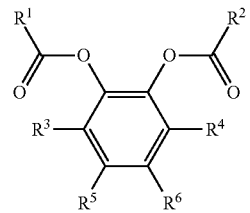

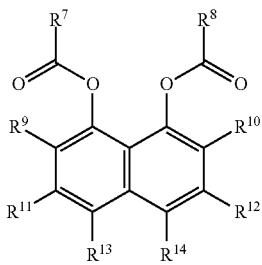

wherein:
each of $R^1$ through $R^{14}$ are independently H, F, Cl, Br, I, alkyl, cycloalkyl, cycloalkylalkyl, aryl, aralkyl, heterocyclyl, heterocyclylalkyl, heteroaryl, or heteroarylalkyl; and q is an integer from 0 to 12.

In one embodiment the internal electron donor may have the following chemical structure:

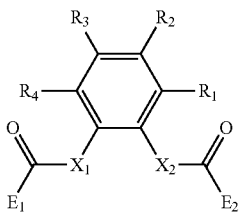

where R1-R4 are the same or different and each R1-R4 is selected from the group consisting of hydrogen, a substituted hydrocarboyl group having 1 to 20 carbon atoms, an a unsubstituted hydrocarobyl having 1 to 20 carbon atoms, a substituted or unsubstituted aryl group having 6 to 20 carbons, an alkoxy group having 1 to 20 carbon atoms, a heteroatom and combinations thereof and at least one of R1-R4 is not hydrogen; where $E_1$ and $E_2$ are the same or different and selected from the group consisting of an alkyl having 1 to 20 carbon atoms, including cycloalkyl groups having 5 to 10 carbon atoms, a substituted alkyl having 1 to 20 carbon atoms, an aryl having 6 to 20 carbon atoms, a substituted aryl having 6 to 20 carbon atoms, or an inert functional group having 1 to 20 carbon atoms and optionally containing heteroatoms; and wherein $X_1$ and $X_2$ are each O, S, an alkyl group, or $NR_5$ and wherein $R_5$ is a hydrocarbyl group having 1 to 20 carbon atoms or is hydrogen.

As used herein, the term "hydrocarbyl" and "hydrocarbon" refer to substituents containing only hydrogen and carbon atoms, including branched or unbranched, saturated or unsaturated, cyclic, polycyclic, fused, or acyclic species, and combinations thereof. Nonlimiting examples of hydrocarbyl groups include alkyl-, cycloalkyl-, alkenyl-, alkadienyl-, cycloalkenyl-, cycloalkadienyl-, aryl-, aralkyl, alkylaryl, and alkynyl-groups.

As used herein, the terms "substituted hydrocarbyl" and "substituted hydrocarbon" refer to a hydrocarbyl group that is substituted with one or more nonhydrocarbyl substituent groups. A nonlimiting example of a nonhydrocarbyl substituent group is a heteroatom. As used herein, a "heteroatom" refers to an atom other than carbon or hydrogen. The heteroatom can be a non-carbon atom from Groups IV, V, VI, and VII of the Periodic Table. Nonlimiting examples of heteroatoms include: halogens (F, Cl, Br, I), N, O, P, B, S, and Si. A substituted hydrocarbyl group also includes a halohydrocarbyl group and a silicon-containing hydrocarbyl group. As used herein, the term "halohydrocarbyl" group refers to a hydrocarbyl group that is substituted with one or more halogen atoms. As used herein, the term "silicon-containing hydrocarbyl group" is a hydrocarbyl group that is substituted with one or more silicon atoms. The silicon atom(s) may or may not be in the carbon chain.

In forming the solid catalyst component of the present disclosure, an organosilicon compound can be used in different ways. For example, the organosilicon compound can be used during precipitation of the catalyst support or otherwise incorporated into the catalyst support. In addition, an organosilicon compound can be contacted with the catalyst in conjunction with an activating agent.

In one embodiment, an organosilicon compound can be used and combined with the magnesium compound, the titanium compound, the supportive electron donor, and the at least one internal electron donor in forming the catalyst support. In one embodiment, the organosilicon compound is incorporated into the catalyst component in an amount such that the molar ratio of silicon to titanium is from about 0.05 to about 10, such as from about 0.1 to about 6.

In one embodiment, the organosilicon compound is represented by formula:

$$R_n Si(OR')_{4-n}$$

wherein each R and R' independently represent a hydrocarbon group, and n is 0≤n<4.

Specific examples of the organosilicon compound include, but are not limited to trimethylmethoxysilane, trimethylethoxysilane, dimethyldimethoxysilane, dimethyldiethoxysilane, diisopropyldimethoxysilane, diisobutyldimethoxysilane, t-butylmethyldimethoxysilane, t-butylmethyldiethoxysilane, t-amylmethyldiethoxysilane, dicyclopentyldimethoxysilane, diphenyldimethoxysilane, phenylmethyldimethoxysilane, diphenyldiethoxysilane, bis-o-tolydimethoxysilane, bis-m-tolydimethoxysilane, bis-p-tolydimethoxysilane, bis-p-tolydiethoxysilane, bisethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, γ-chloropropyltrimethoxysilane, methyltriethoxysilane, ethyltriethoxysilane, vinyltriethoxysilane, t-butyltriethoxysilane, nbutyltriethoxysilane, isobutyltriethoxysilane, phenyltriethoxysilane, γ-amniopropyltriethoxysilane, cholotriethoxysilane, ethyltriisopropoxysilane, vinyltributoxysilane, cyclohexyltrimethoxysilane, cyclohexyltriethoxysilane, 2-norbornanetrimethoxysilane, 2-norboranetriethoxysilane, 2-norboranemethyldimethoxysilane, ethyl silicate, butyl silicate, trimethylphenoxysilane, and methyltriallyloxysilane.

In another embodiment, the organosilicon compound is represented by Formula:

$$SiRR'_m(OR'')_{3-m}$$

wherein, 0≤m<3, such as 0≤m<2; and R independently represents a cyclic hydrocarbon or substituted cyclic hydrocarbon group. Specific examples of the group R include, but are not limited to: cyclopropyl; cyclobutyl; cyclopentyl; 2-methylcyclopentyl; 3-methylcyclopentyl; 2-ethylcyclopentyl; 3-propylcyclopentyl; 3-isopropylcyclopentyl; 3-butylcyclopentyl; 3-tertiary-butyl cyclopentyl; 2,2-dimethylcyclopentyl; 2,3-dimethylcyclopentyl; 2,5-dimethylcyclopentyl; 2,2,5-trimethylcyclopentyl; 2,3,4,5-tetramethylcyclopentyl; 2,2,5,5-tetramethylcyclopentyl;

1-cyclopentylpropyl; 1-methyl-1-cyclopentylethyl; cyclopentenyl; 2-cyclopentenyl; 3-cyclopentenyl; 2-methyl-1-cyclopentenyl; 2-methyl-3-cyclopentenyl; 3-methyl-3-cyclopentenyl; 2-ethyl-3-cyclopentenyl; 2,2-dimethyl-3-cyclopentenyl; 2,5-dimethyl-3-cyclopentenyl; 2,3,4,5-tetramethyl-3-cyclopentenyl; 2,2,5,5-tetramethyl-3-cyclopentenyl; 1,3-cyclopentadienyl; 2,4-cyclopentadienyl; 1,4-cyclopentadienyl; 2-methyl-1,3-cyclopentadienyl; 2-methyl-2,4-cyclopentadienyl; 3-methyl-2,4-cyclopentadienyl; 2-ethyl-2,4-cyclopentadienyl; 2,2-dimethyl-2,4-cyclopentadienyl; 2,3-dimethyl-2,4-cyclopentadienyl; 2,5-dimethyl-2,4-cyclopentadienyl; 2,3,4,5-tetramethyl-2,4-cyclopentadienyl; indenyl; 2-methylindenyl; 2-ethylindenyl; 2-indenyl; 1-methyl-2-indenyl; 1,3-dimethyl-2-indenyl; indanyl; 2-methylindanyl; 2-indanyl; 1,3-dimethyl-2-indanyl; 4,5,6, 7-tetrahydroindenyl; 4,5,6, 7-tetrahydro-2-indenyl; 4,5,6, 7-tetrahydro-1-methyl-2-indenyl; 4,5,6, 7-tetrahydro-1,3-dimethyl-2-indenyl; fluorenyl groups; cyclohexyl; methylcyclohexyl; ethylcylcohexyl; propylcyclohexyl; isopropylcyclohexyl; n-butylcyclohexyl; tertiary-butyl cyclohexyl; dimethylcyclohexyl; and trimethylcyclohexyl.

In the formula: SiRR'$_m$(OR")$_{3-m}$, R' and R" are identical or different and each represents a hydrocarbon. Examples of R' and R" are alkyl, cycloalkyl, aryl and aralkyl groups having 3 or more carbon atoms. Furthermore, R and R' may be bridged by an alkyl group, etc. General examples of organosilicon compounds are those in which R is cyclopentyl group, R' is an alkyl group such as methyl or cyclopentyl group, and R" is an alkyl group, particularly a methyl or ethyl group.

Specific examples of organosilicon compounds of formula SiRR'$_m$(OR")$_{3-m}$ include, but are not limited to trialkoxysilanes such as cyclopropyltrimethoxysilane, cyclobutyltrimethoxysilane, cyclopentyltrimethoxysilane, 2-methylcyclopentyltrimethoxysilane, 2,3-dimethylcyclopentyltrimethoxysilane, 2,5-dimethylcyclopentyltrimethoxysilane, cyclopentyltriethoxysilane, cyclopentenyltrimethoxysilane, 3-cyclopentenyltrimethoxysilane, 2,4-cyclopentadienyltrimethoxysilane, indenyltrimethoxysilane and fluorenyltrimethoxysilane; dialkoxysilanes such as dicyclopentyldimethoxysilane, bis(2-methylcyclopentyl)dimethoxysilane, bis(3-tertiary-butylcyclopentyl)dimethoxysilane, bis(2,3-dimethylcyclopentyl)dimethoxysilane, bis(2,5-dimethylcyclopentyl)dimethoxysilane, dicyclopentyldiethoxysilane, dicyclobutyldiethoxysilane, cyclopropylcyclobutyldiethoxysilane, dicyclopentenyldimethoxysilane, di(3-cyclopentenyl)dimethoxysilane, bis(2,5-dimethyl-3-cyclopentenyl)dimethoxysilane, di-2,4-cyclopentadienyl)dimethoxysilane, bis(2,5-dimethyl-2,4-cyclopentadienyl)dimethoxysilane, bis(1-methyl-1-cyclopentylethyl)dimethoxysilane, cyclopentylcyclopentenyldimethoxysilane, cyclopentylcyclopentadienyldimethoxysilane, diindenyldimethoxysilane, bis(1,3-dimethyl-2-indenyl)dimethoxysilane, cyclopentadienylindenyldimethoxysilane, difluorenyldimethoxysilane, cyclopentylfluorenyldimethoxysilane and indenylfluorenyldimethoxysilane; monoalkoxysilanes such as tricyclopentylmethoxysilane, tricyclopentenylmethoxysilane, tricyclopentadienylmethoxysilane, tricyclopentylethoxysilane, dicyclopentylmethylmethoxysilane, dicyclopentylethylmethoxysilane, dicyclopentylmethylethoxysilane, cyclopentyldimethylmethoxysilane, cyclopentyldiethylmethoxysilane, bis(2,5-dimethylcyclopentyl)cyclopentylmethoxysilane, dicyclopentylcyclopentenylmethoxysilane, dicyclopentyl- cyclopentenadienylmethoxysilane and diindenylcyclopentylmethoxysilane; and ethylenebis-cyclopentyldimethoxysilane.

According to the present disclosure, once the catalyst precursor component is formed, the catalyst component is contacted with an activating agent that produces an activated solid catalyst component. The activating agent, for instance, can convert titanium bonds, such as titanium and chloride bonds, to titanium and carbon bonds. The titanium and carbon bonds can then serve as active sites for the initiation of a polymerization process using olefin monomers. In one embodiment, the activating agent is a hydrocarbyl aluminum compound represented by the formula $R_3Al$ wherein each R is an alkyl, cycloalkyl, aryl, or hydride radical; at least one R is a hydrocarbyl radical; two or three R radicals can be joined in a cyclic radical forming a heterocyclic structure; each R can be the same or different; and each R, which is a hydrocarbyl radical, has 1 to 20 carbon atoms, and preferably 1 to 10 carbon atoms. In a further embodiment, each alkyl radical can be straight or branched chain and such hydrocarbyl radical can be a mixed radical, i.e., the radical can contain alkyl, aryl, and/or cycloalkyl groups. Nonlimiting examples of suitable radicals are: methyl, ethyl, n-propyl, isopropyl, n-butyl, isobutyl, tert-butyl, n-pentyl, neopentyl, n-hexyl, 2-methylpentyl, n-heptyl, n-octyl, isooctyl, 2-ethylhexyl, 5,5-dimethylhexyl, n-nonyl, n-decyl, isodecyl, n-undecyl, n-dodecyl.

Nonlimiting examples of suitable hydrocarbyl aluminum compounds are as follows: triisobutylaluminum, tri-n-hexylaluminum, diisobutylaluminum hydride, di-n-hexylaluminum hydride, isobutylaluminum dihydride, n-hexylaluminum dihydride, diisobutylhexylaluminum, isobutyldihexylaluminum, trimethylaluminum, triethylaluminum, tri-n-propylaluminum, triisopropylaluminum, tri-n-butylaluminum, tri-n-octylaluminum, tri-n-decylaluminum, tri-n-dodecylaluminum.

In one embodiment, triethylaluminum is used. The molar ratio of aluminum to titanium is from about 0:1 to about 200, or from about 0.5 to about 20.

As described above, an organosilicon compound can be incorporated into the catalyst support and also used in conjunction with the activating agent. For instance, the aluminum compound as described above can be added to the catalyst component in conjunction with an organosilicon compound or can be added to the catalyst component after the organosilicon compound has been added. The organosilicon compound can be any of the organosilicon compounds described above.

In accordance with the present disclosure, the activated solid catalyst component also undergoes a prepolymerization step in which relatively small amounts of polymer are formed and integrated into the catalyst particles. In this regard, the activated solid catalyst component is combined with an olefin monomer. For example, the olefin monomer may be an alpha-olefin having the formula:

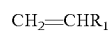

$$CH_2=CHR_1$$

wherein $R_1$ comprises hydrogen, or a C1 to C7 alkyl group.

In one embodiment, the olefin monomer comprises propylene. The prepolymerization process can be conducted generally at temperatures greater than about −20° C., such as greater than about −10° C., such as greater than about 0° C., and generally less than about 60° C., such as generally less than about 50° C., such as generally less than about 40° C., such as generally less than about 30° C.

In one embodiment, the pre-polymerization process is carried out in a slurry. For example, in one embodiment, the activated solid catalyst component can be combined with an inert hydrocarbon medium. The liquid phase, for instance, may be an aliphatic hydrocarbon, such as propane, butane, pentane, hexane, heptane, octane, decane, dodecane, and/or kerosene. Alicyclic hydrocarbons may also be used including cyclopentane, cyclohexane, and methylcyclopentane. Aromatic hydrocarbons can also be utilized for the slurry polymerization. Aromatic hydrocarbons include benezyne, toluene, xylene, and mixtures thereof. In one embodiment, for instance, the hydrocarbon liquid is hexane.

The activated solid catalyst component is combined with a hydrocarbon liquid and contacted with controlled amounts of an olefin monomer at controlled temperatures. The reaction temperature for the preliminary polymerization, for instance, can be sufficient for the resulting preliminary polymer to not dissolve in the hydrocarbon medium while also being sufficient for the polymerization reaction to occur. The temperature can be from about 0 degrees C. to about 20 degrees C. If an organosilcon compound is used during activation, the organosilicon compound can be added in the presence of the activating agent or after the activating agent has been added. In either case, the organosilicon compound is added before contact with the olefin monomer. Alternatively, an organosilicon compound is not used during activation.

Optionally, a molecular-weight controlling agent such as hydrogen may also be added to the slurry during the preliminary polymerization.

In accordance with the present disclosure, the preliminary polymerization reaction conditions are controlled such that the amount of polymer formed is less than about 50 g per 1 g of the catalyst component, such as less than about 40 g per 1 g of the catalyst component, such as less than about 30 g per 1 g of the catalyst component, such as less than about 20 g per 1 g of the catalyst component. The amount of polymer formed is generally greater than about 1 g per 1 g of the catalyst component, such as greater than about 5 g per 1 g of the catalyst component, such as greater than about 10 g per 1 g of the catalyst component.

The resulting activated and pre-polymerized solid catalyst can be washed with hydrocarbons and isolated in a dried form or in a slurry in hydrocarbons or mineral oil.

The resulting activated and pre-polymerized solid catalyst particles have a substantially spherical shape that can lead to improved polymer morphology when used to produce polyolefin polymers.

The pre-polymerized and activated solid catalyst component of the present disclosure has been found to offer various advantages and benefits which are believed to stem from the different components used to produce the catalyst particles as described above. For example, although unknown, it is believed that the supportive electron donor facilitates formation of the solid catalyst component by maximizing the amount of internal electron donors that are incorporated into the catalyst component. For example, it is believed that at least a portion of the supportive electron donors are removed from the catalyst component and preferentially replaced by the internal electron donor during formation of the catalyst. In addition, it is believed that the organosilicon compound is inserted into vacancies on the magnesium compound surface formed after the supportive electron donor is removed during treatment with the aluminum compound providing a very stable and active catalyst component which is able to produce polymers with improved polymer morphology.

As described above, the prepolymerized, active solid catalyst component of the present disclosure is very stable and can be stored for several months at ambient conditions without losing catalyst activity. Although unknown, it is believed that stability is related to the incorporation of the supportive electron donor, the internal electron donor, and the organosilicon compound into the activated solid catalyst component. Further, it is believed that the polymer formed on the catalyst particles produces stable active polymerization centers that are well suited for use in later polymerization processes.

The relative amounts of the components may also provide benefits in terms of catalyst activity and stability. For example, increasing the amount of the aluminum compound may lead to a reduction in the amount of internal electron donor incorporated into the catalyst component, which can result not only in a reduction in catalyst activity but also in a reduction in stereoselectivity. The organosilicon compound, on the other hand, can protect the internal electron donor incorporated into the catalyst component and prevent withdrawal. In general, increasing the concentration of the internal electron donor on the activated catalyst component can lead to higher activity. The supportive electron donor and the organosilicon compound both can serve to maintain high concentrations of the internal electron donor.

Once the activated solid catalyst component of the present disclosure is prepared, the catalyst can be stored and later used in polyolefin polymerization processes. For example, the activated solid catalyst component of the present disclosure can be combined with other components for creating a catalyst system for polyolefin polymers, such as polypropylene polymers. The catalyst system used to produce the polyolefin polymer can include the activated solid catalyst component of the present disclosure in combination with greater amounts of the aluminum compound described above and/or with greater amounts of the organosilicon compound as described above. In addition, the catalyst system can include an activity limiting agent (ALA). As used herein, an "activity limiting agent" ("ALA") is a material that reduces catalyst activity at elevated temperature (i.e., temperature greater than about 85° C.). An ALA inhibits or otherwise prevents polymerization reactor upset and ensures continuity of the polymerization process. Typically, the activity of Ziegler-Natta catalysts increases as the reactor temperature rises. Ziegler-Natta catalysts also typically maintain high activity near the melting point temperature of the polymer produced. The heat generated by the exothermic polymerization reaction may cause polymer particles to form agglomerates and may ultimately lead to disruption of continuity for the polymer production process. The ALA reduces catalyst activity at elevated temperature, thereby preventing reactor upset, reducing (or preventing) particle agglomeration, and ensuring continuity of the polymerization process. The ALA can be also added to the catalyst component during the activation by alkyl aluminum compound.

The activity limiting agent may be a carboxylic acid ester. The aliphatic carboxylic acid ester may be a $C_4$-$C_{30}$ aliphatic acid ester, may be a mono- or a poly-(two or more) ester, may be straight chain or branched, may be saturated or unsaturated, and any combination thereof. The $C_4$-$C_{30}$ aliphatic acid ester may also be substituted with one or more Group 14, 15 or 16 heteroatom containing substituents. Nonlimiting examples of suitable $C_4$-$C_{30}$ aliphatic acid esters include $C_{1-20}$ alkyl esters of aliphatic $C_{4-30}$ monocarboxylic acids, $C_{1-20}$ alkyl esters of aliphatic $C_{8-20}$ monocarboxylic acids, $C_{1-4}$ allyl mono- and diesters of aliphatic $C_{4-20}$ monocarboxylic acids and dicarboxylic acids, $C_{1-4}$ alkyl esters of aliphatic $C_{8-20}$ monocarboxylic acids and dicarboxylic acids, and $C_{4-20}$ mono- or polycarboxylate derivatives of $C_{2-100}$ (poly)glycols or $C_{2-100}$ (poly)glycol ethers. In a further embodiment, the $C_4$-$C_{30}$ aliphatic acid ester may be a laurate, a myristate, a palmitate, a stearate, an oleates, a sebacate, (poly)(alkylene glycol) mono- or diacetates, (poly)(alkylene glycol) mono- or di-myristates, (poly)(alkylene glycol) mono- or di-laurates, (poly)(alkylene glycol) mono- or di-oleates, glyceryl tri(acetate), glyceryl tri-ester of $C_{2-40}$ aliphatic carboxylic acids, and mixtures thereof. In a further embodiment, the $C_4$-$C_{30}$ aliphatic ester is isopropyl myristate, di-n-butyl sebacate and/or pentyl valerate, and/or octyl acetate.

The catalyst system of the present disclosure can be used in all different types of polymerization processes. For instance, the catalyst system can be used in bulk polymerization processes and in gas phase processes. In each process, one or more olefin monomers are contacted with the catalyst system under polymerization conditions.

One or more olefin monomers can be introduced into a polymerization reactor to react with the catalyst system and to form a polymer, such as a fluidized bed of polymer particles. Nonlimiting examples of suitable olefin monomers include ethylene, propylene, $C_{4-20}$ α-olefins, such as 1-butene, 1-pentene, 1-hexene, 4-methyl-1-pentene, 1-heptene, 1-octene, 1-decene, 1-dodecene and the like; $C_{4-20}$ diolefins, such as 1,3-butadiene, 1,3-pentadiene, norbornadiene, 5-ethylidene-2-norbornene (ENB) and dicyclopentadiene; $C_{8-40}$ vinyl aromatic compounds including styrene, o-, m-, and p-methylstyrene, divinylbenzene, vinylbiphenyl, vinylnapthalene; and halogen-substituted $C_{8-40}$ vinyl aromatic compounds such as chlorostyrene and fluorostyrene.

As used herein, "polymerization conditions" are temperature and pressure parameters within a polymerization reactor suitable for promoting polymerization between the catalyst composition and an olefin to form the desired polymer. The polymerization process may be a gas phase, a slurry, or a bulk polymerization process, operating in one, or more than one reactor.

In one embodiment, polymerization occurs by way of gas phase polymerization. As used herein, "gas phase polymerization" is the passage of an ascending fluidizing medium, the fluidizing medium containing one or more monomers, in the presence of a catalyst through a fluidized bed of polymer particles maintained in a fluidized state by the fluidizing medium. "Fluidization," "fluidized," or "fluidizing" is a gas-solid contacting process in which a bed of finely divided polymer particles is lifted and agitated by a rising stream of gas. Fluidization occurs in a bed of particulates when an upward flow of fluid through the interstices of the bed of particles attains a pressure differential and frictional resistance increment exceeding particulate weight. Thus, a "fluidized bed" is a plurality of polymer particles suspended in a fluidized state by a stream of a fluidizing medium. A "fluidizing medium" is one or more olefin gases, optionally a carrier gas (such as $H_2$ or $N_2$) and optionally a liquid (such as a hydrocarbon) which ascends through the gas-phase reactor.

A typical gas-phase polymerization reactor (or gas phase reactor) includes a vessel (i.e., the reactor), the fluidized bed, a distribution plate, inlet and outlet piping, a compressor, a cycle gas cooler or heat exchanger, and a product discharge system. The vessel includes a reaction zone and a velocity reduction zone, each of which is located above the distribution plate. The bed is located in the reaction zone. In an embodiment, the fluidizing medium includes propylene gas and at least one other gas such as an olefin and/or a carrier gas such as hydrogen or nitrogen.

In one embodiment, the contacting occurs by way of feeding the catalyst composition into a polymerization reactor and introducing the olefin into the polymerization reactor.

Various different types of polymers can be produced using a catalyst system of the present disclosure. For instance, the catalyst system can be used to produce polypropylene homopolymers, polypropylene copolymers, and polypropylene terpolymers. The catalyst system can also be used to produce impact resistant polymers that have elastomeric properties.

Impact resistant polymers that have rubber-like or elastomeric properties are typically made in a two reactor system where it is desirable for the catalyst to maintain high activity levels. In one embodiment, for instance, the polymerization is performed in two reactors connected in series. A propylene homopolymer or a propylene copolymer can be formed in the first reactor in order to form an active propylene-based polymer. The active propylene-based polymer from the first polymerization reactor is then introduced into a second polymerization reactor and contacted, under second polymerization conditions, with at least one second monomer in the second reactor to form a propylene impact copolymer. In one embodiment, the process includes contacting the active propylene-based polymer with propylene and ethylene in the second polymerization reactor under polymerization conditions and forming a discontinuous phase of propylene/ethylene copolymer.

As described above, the first phase polymer can comprise a polypropylene homopolymer. In an alternative embodiment, however, the first phase polymer may comprise a random copolymer of polypropylene.

The random copolymer, for instance, can be a copolymer of propylene and an alpha-olefin, such as ethylene. The polypropylene random copolymer forms the matrix polymer in the polypropylene composition and can contain the alpha-olefin in an amount less than about 12% by weight, such as in an amount less than about 5% by weight, such as in an amount less than about 4% by weight, and generally in an amount greater than about 0.5% by weight, such as in an amount greater than about 1% by weight, such as in an amount greater than about 1.5% by weight, such as in an amount greater than about 2% by weight.

The second phase polymer is a propylene and alpha-olefin copolymer. The second phase polymer, however, has elastomeric or rubber-like properties. Thus, the second phase polymer can dramatically improve the impact strength resistance of the polymer.

The second phase polymer which forms a dispersed phase within the polymer composition contains the alpha-olefin or ethylene in an amount generally greater than about 10% by weight (of the rubber part), such as in an amount greater than about 20% by weight, such as in an amount greater than about 40% by weight and generally less than about 65% by weight, such as less than about 45% by weight, based on the weight of the second phase polymer.

As described above, the catalyst system of the present disclosure can produce various different polymers having spherical particles and relatively high bulk densities in addition to producing polymers with improved morphology, the catalyst system of the present disclosure has also been found to have not only high catalyst activity but a prolonged catalyst lifetime that makes the catalyst system particularly well suited for use into reactor systems.

The present disclosure may be better understood with reference to the following examples.

EXAMPLES

Definitions

The following parameters are defined as follows.

Catalyst particle morphology is indicative of the polymer particle morphology produced therefrom. The three parameters of polymer particle morphology (sphericity, symmetry and aspect ratio) may be determined using a Camsizer instrument. Camsizer Characteristics:

$$\text{Sphericity } SPHT = \frac{4\pi A}{P^2} = \text{Circularity2 (ISO 9276-6)},$$

where:

P is the measured perimeter/circumference of a particle projection; and

A is the measured area covered by a particle projection. P is the measured perimeter/circumference of a particle projection; and A is the measured area covered by a particle projection.

For an ideal sphere, SPHT is defined as 1. Otherwise, the value is less than 1.

The symmetry is defined as:

$$Symm_{0,3} = \frac{1}{2}\left(1 + \min\left(\frac{r_1}{r_2}\right)\right)$$

where, $r_1$ und $r_2$ are distance from the centre of area to the borders in the measuring direction. For asymmetric particles Symm is less than 1. If the centre of the area is outside the particle, i.e.

$$\frac{r_1}{r_2} < 0,$$

the Symm is less than 0.5.

$X_{Ma}=r_1+r_2$, or "Symm," is the minimum value of measured set of symmetry values from different directions.

Aspect Ratio:

$$B/L_{0,2,3} = \frac{x_{c\ min}}{x_{Fe\ max}}$$

where $x_{e\ min}$ and $x_{Fe\ max}$ out of the measured set of $x_e$ and $x_{Fe}$ values.

The catalyst morphology characteristics such as aspect ratio ("B/L3") can be used for characterization of polymer morphology.

"$D_{10}$" represents the size of particles (diameter), wherein 10% of particles are less than that size, "$D_{50}$" represents the size of particles, wherein 50% of particles are less than that size, and "$D_{90}$" represents the size of particles, wherein 90% of particles are less than that size. "Span" represents the distribution of the particle sizes of the particles. The value can be calculated according to the following formula:

$$\text{Span}=(D_{90}-D_{10})/D_{50}$$

"PP" prior to any D or Span value indicates the D value or Span value for polypropylene prepared using the catalysts indicated.

BD is an abbreviation for bulk density, and is reported in units of g/ml.

CE is an abbreviation for catalyst efficiency and is reported in units of Kg polymer per gram of catalyst (Kg/g) during the polymerization for 1 hour.

MFR is an abbreviation for melt flow rate and is reported in units of g/10 min. The MFR is measured cording to ASTM Test D1238 T.

The catalyst component particle size analysis was conducted using laser light scattering method by Malvern Mastersizer 3000 instrument. Toluene is used as a solvent.

IED is an abbreviation for internal electron donor.

EB is an abbreviation for ethyl benzoate.

TBP is an abbreviation for tributyl phosphate.

ECH is an abbreviation for epichlorohydrin.

TEOS is an abbreviation for tetraethylorthosilicate.

Ti, Mg, and D are the weight percentages (wt %) for each of the titanium, magnesium, and internal donor, respectively, in the composition.

XS is an abbreviation for xylene soluble and is reported in units of wt %.

Bulk Propylene Polymerization

Catalysts of the examples were used in a method of propylene polymerization. The following method was used. The reactor was baked at 100° C. under nitrogen flow for 30 minutes prior to the polymerization run. The reactor was cooled to 30-35° C. and cocatalyst (1.5 ml of 25 wt % triethylaluminum (TEAl)), C-donor (cyclohexylmethydimethoxysilane) (1 ml), hydrogen (3.5 psi) and liquid propylene (1500 ml) were added in this sequence into the reactor. The catalyst (5-10 mg), loaded as a mineral oil slurry, was pushed into the reactors using high pressure nitrogen. The polymerization was performed for one hour at 70° C. After the polymerization, the reactors were cooled to 22° C., vented to atmospheric pressure, and the polymer collected.

Catalysts of the examples were used in a method of gas phase propylene polymerization. The following method was used. The reactor was baked at 100° C. under nitrogen flow for 30 minutes prior to the polymerization run. The reactor was cooled to 30° C. and propylene was charged (150 g), with cocatalyst (0.27 ml of 25 wt % triethylaluminum (TEAl)), C-donor (cyclohexylmethydimethoxysilane) (0.38 ml), and hydrogen (0.5 g). A reactor was heated to 35° C. and the catalyst component (0.5-0.7 mg) was flashed to the reactor with propylene (150 g). The polymerization was performed for one hour at 70° C. After the polymerization, the reactors were cooled to 22° C., vented to atmospheric pressure, and the polymer collected. The catalyst activity of the activated catalyst component is calculated based on the content of the primary catalyst component.

Example 1

MgCl2 (13.2 g), Al(OCH(CH3)2)3 (1.0 g), toluene (59.5 g), tri-n-butylphosphate (36.3 g), and epichlorohydrin (14.25 g) were combined and heated to 60° C. with agitation at 600 rpm for 8 hours under a nitrogen atmosphere. Upon cooling to room temperature, toluene (140 g) was added, along with ethyl benzoate (3.5 g) and tetraethylorthosilicate (6 g). The mixture was then cooled to −25° C. and TiCl4 (261 g) was slowly added under 600 rpm stirring, while maintaining the temperature at −25° C. After the addition was complete, the temperature was maintained for 1 hour prior to warming to 35° C. over 30 minutes, at which temperature it was held for 30 minutes, then the temperature was raised to 85° C. over 30 minutes and held for 30 minutes prior to collection of a solid precipitate via filtration. The solid precipitate was washed three times with toluene (200 ml, each wash). The resulting precipitate was then combined with in toluene (264 ml). This mixture was heated under agitation to 105° C., followed by addition of an internal electron donor (2.0 g) in toluene (10 g). The internal electron donor had the following formula:

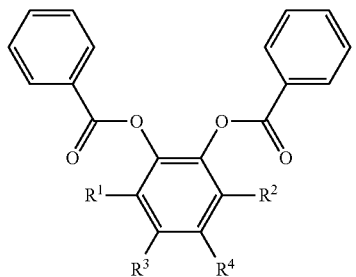

where $R^1$-R4-selected from hydrogen or alkyl groups, $R^3$ $R^4$ $R^5$ $R^6$ are the same or different alkyl or cycloalkyl having 1 to 20 carbon atoms, heteroatom or combination of them. In this example, one of the R groups was methyl while another R group was tert-butyl (3-methyl-5-t-butyl catechol dibenzoate) (CDB-1).

Heating at 105° C. was continued for 1 hour prior to collection of the solid via filtration. The process included combining with TiCl4 in toluene, heating at 105° C. and again at 110° C. before washing the final product four times with hexane (200 ml, each wash), and agitating at 60-65° C. for 10 minutes for each wash. The catalyst component was then discharged as a hexane slurry.

Examples 2-4 illustrate the composition and the catalyst behavior of the activated catalyst components prepared without pre-polymer. The catalyst component from Example 1 was treated according to Table 1. The activation of the catalyst component was conducted with different amounts of external donor D (Examples 2 and 3). Example 4 was conducted in the presence of a second electron donor, diether (3,3-bis(methoxymethyl)-2,6-dimethylheptane) (DEM). Examples 2-4 demonstrate a relatively different amount of withdrawal of internal electron donor and EB during the activation process and different catalytic behavior.

The activated catalyst from Example 4 produced polymer with high BD (0.46 g/cc) with rounded solid shaped polymer particles as shown in FIG. 1.

TABLE 1

Catalyst composition of activated catalyst (No polypropylene in catalysts)

| Example | Condition, mol | % Ti | % Mg | % Al | % CDB-1 | % CDB-1 loss | % EB | % EB loss | % D-Donor | % DEMH |
|---|---|---|---|---|---|---|---|---|---|---|
| Example 1 | Non-activated | 3.09 | 16.51 | — | 9.81 | — | 5.79 | — | 0 | 0 |
| Example 2 | Ti/Al/D = 1/3/1 | 2.80 | 16.35 | 1.72 | 6.49 | 33.8 | 1.68 | 71.0 | 7.52 | 0 |
| Example 3 | Ti/Al/D = 1/3/3 | 2.96 | 16.47 | 0.51 | 8.26 | 15.8 | 4.04 | 30.2 | 10.11 | 0 |
| Example 4 | Ti/Al/D/DEMH = 1/3/1/1 | 2.74 | 15.80 | 0.74 | 7.31 | 25.5 | 3.06 | 47.2 | 8.35 | 11.28 |

TABLE 2

Polymerization behavior of the activated catalysts (No polypropylene in catalysts)

| Example | CE, kg/g | MFR, g/10 min | XS, % | BD, g/cc | PPD10 | PP D50, μ | PP D90 | Span | B/L3 |
|---|---|---|---|---|---|---|---|---|---|
| Example 1 | 89.0 | 0.45 | 2.13 | 0.420 | 475 | 617 | 1058 | 0.945 | 0.706 |
| Example 2 | 37.8 | 1.23 | 1.68 | 0.437 | 356 | 474 | 909 | 1.167 | 0.709 |
| Example 3 | 43.0 | 3.02 | 2.00 | 0.402 | 365 | 456 | 724 | 0.787 | 0.717 |
| Example 4 | 28.4 | 3.57 | 1.92 | 0.455 | 334 | 415 | 645 | 0.749 | 0.740 |

The activated catalyst components containing polypropylene in Examples 5-7 were prepared by activation of the non-phthalate catalyst component from Example 1.

Example 5. The catalyst of Example 1 (27.0 g of hexane slurry based on 5.0 g dry) was added to a reactor. 250 ml of hexane was added. 2.1 g D donor (Dicyclopentyldimethoxysilane) (in 2 g of hexane) was added. The reactor temperature set at 10° C. 21 g of 10% TEAL in heptane was added to reactor. The reactor was heated to 30° C. and held for 120 min at 250 rpm. The reactor was cooled down to 5° C. and TEAL (7 g of 10% TEAL in heptane) was added. After a few minutes propylene (10 g) was added during 40 minutes. The reactor temperature was raised to 30° C. The solid was washed with hexane and dried.

Example 6. Example 5 was repeated except the AlEt$_3$ was added in one time.

Example 7. Example 6 was repeated except the amount of AlEt3 was reduced according to Table 3.

Example 8. Example 7 was repeated except the amounts AlEt3 and external-donor were reduced according to Table 3. The external donor was C-donor.

Example 9 illustrates the composition and catalytic properties of the non-phthalate catalyst component prepared as in Example 1 except in different time.

Example 10 shows the preparation of the activated catalyst component, composition and catalytic properties of the activated catalyst component. Example 8 was repeated except the non-phthalate catalyst component from Example 9 was used and the amount of AlEt3 and C-donor were used as recorded in Table 3.

The properties of the activated catalyst components from Examples 5-8 and 10 are presented in Table 3. The activated catalyst components contain pre-polymer in amount of around 2 g per 1 gram of the catalyst component. The activated catalyst component particle size increased by a few microns compared with the catalyst component particle size.

Figure 2:
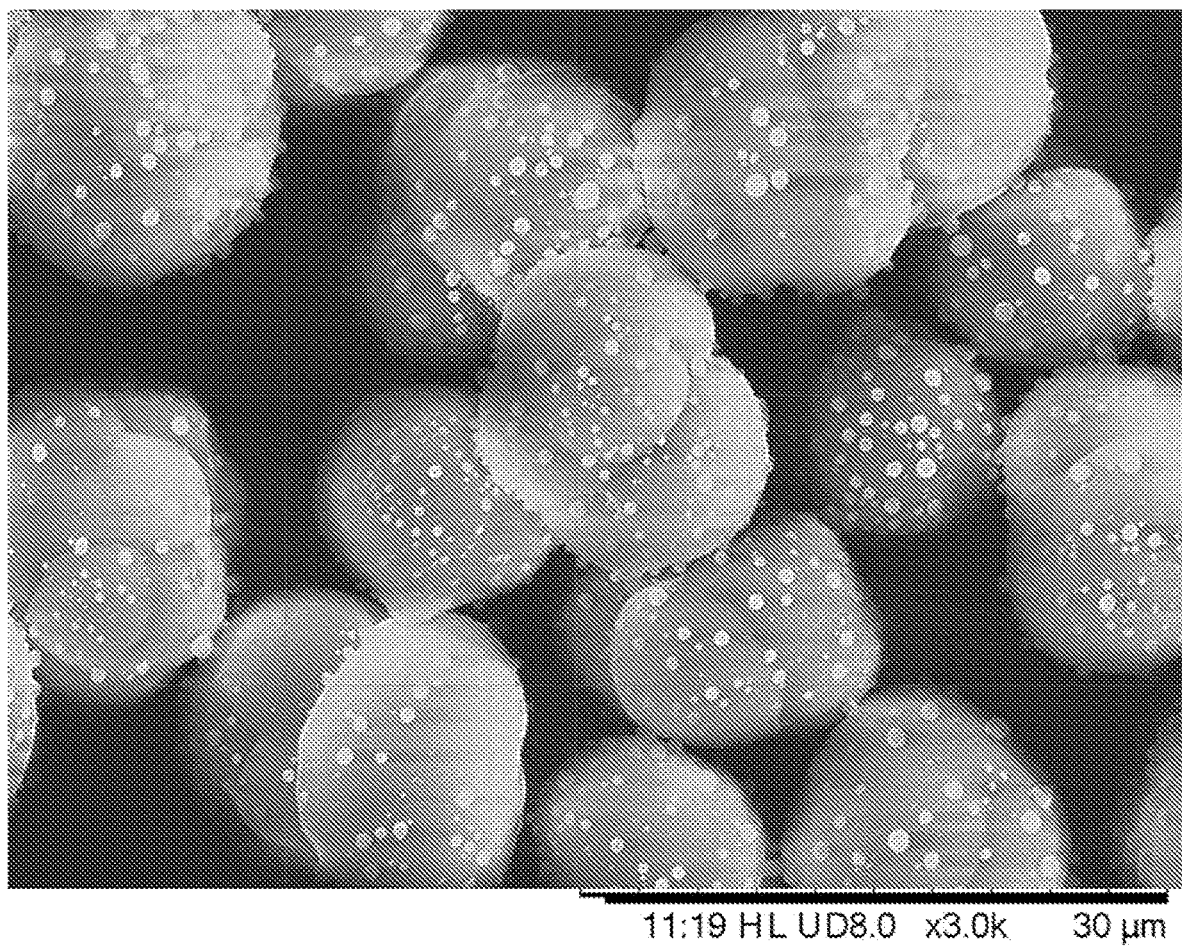
FIG. 2 is a SEM image of activated catalyst component particles with rounded morphology produced in Example 10.

The activated catalyst components from Examples 5-9 and 10 produced polymers with high bulk density and improved polymer morphology. It was found that the polymer particle shape is substantially spherical. The activated catalyst component from Example 10 was tested in bulk and gas phase propylene polymerization. The activated catalyst component showed high catalyst activity and produced polymer with very high bulk density (BD=0.50 g/cc in bulk propylene polymerization, and 0.45 g/cc in gas phase reactor). SEM images of polymer particles are in FIG. 2 and FIG. 3.

The amount of internal electron donor ("IED") and EB in the activated catalyst components are variable by conditions of the activation. It was found that the supportive electron donor is mostly removed during the activation process. At the same time, most of the amount of IED is still in the activated catalyst components. It was also found that the catalyst activities of the activated catalyst components are related to the amount left in the activated catalyst components.

TABLE 3

Catalyst compostion of the activated catalysts (containing PP)

| Example | PD | Ti/Al/D (mol) | D50 | span | % Ti | % Mg | Al, % | EB, % | IED, % |
|---|---|---|---|---|---|---|---|---|---|
| Example 1 | 0 | No treated | 11.6 | 0.681 | 3.07 | 16.60 | 0 | 5.79 | 9.97 |
| Example 5 | 2.28 | 1/8/3 | 20.1 | 1.824 | 0.82 | 5.07 | 0.628 | 0.13 | 1.37 |
| Example 6 | 2.62 | 1/8/3 | 16.5 | 1.021 | 0.71 | 4.29 | 0.583 | 0.16 | 1.34 |
| Example 7 | 2.47 | 1/6/3 | 16.5 | 1.099 | 0.76 | 4.50 | 0.495 | 0.24 | 1.43 |
| Example 8 | 2.12 | 1/3/0.35 | 15.8 | 0.957 | 0.73 | 4.54 | 0.556 | 0.64 | 2.51 |
| Example 9 | 0 | No treated | 10.9 | 0.718 | 3.12 | 16.93 | 0 | 5.79 | 9.54 |
| Example 10 | 2.21 | 1/3/0.1 | 15.8 | 1.212 | 0.81 | 4.93 | 0.584 | 0.67 | 2.72 |

PD is polymerization degree, PD = C3/Catalyst (wt)

TABLE 4

Loss of IED and EB during the activation of catalyst component

| Example | Ti/Al/D (mol) | % IED loss | % EB loss |
|---|---|---|---|
| Example 5 | 1/8/3 | 55.1 | 92.6 |
| Example 6 | 1/8/3 | 48.0 | 89.0 |
| Example 7 | 1/6/3 | 47.2 | 84.6 |
| Example 8 | 1/3/0.35 | 7.9 | 59.8 |
| Example 10 | 1/3/0.1 | 1.9 | 60.0 |

TABLE 5

Polymerization behavior of the activated catalysts (with propylene)

| Example | CE/ Kg/g | MFR, g/10 min | BD, g/cc | XS, % | PP D50, μ | span | B/L3 |
|---|---|---|---|---|---|---|---|
| Example 1 | 89 | 0.45 | 0.420 | 2.13 | 617 | 0.945 | 0.706 |
| Example 5 | 15.6 | 1.19 | — | 2.05 | 346 | 2.538 | 0.718 |
| Example 6 | 23.4 | 0.91 | 0.421 | 1.73 | 987 | 1.226 | 0.667 |
| Example 7 | 25.4 | 0.89 | 0.433 | 2.04 | 617 | 2.003 | 0.696 |
| Example 8 | 66.1 | 1.19 | 0.358 | 2.15 | 511 | 1.041 | 0.721 |
| Example 9 (comparative) | 83.4 | 0.27 | 0.426 | 2.08 | 701 | 1.2 | 0.678 |
| Example 10 | 66.8 | 0.94 | 0.500 | 2.00 | 524 | 1.05 | 0.758 |

TABLE 6

Comparison of Catalyst behavior: catalyst component (comparative Example 9) and activated catalyst component (Example 10)

| Example | Polymerization type | CE/ Kg/g | BD, g/cc | XS, % | PP D50, μ | B/L3 |
|---|---|---|---|---|---|---|
| Example 9 (comparative) | Bulk propylene | 83.4 | 0.426 | 2.08 | 701 | 0.678 |
| Example 9 (comparative) | Gas phase | 47.4 | 0.391 | 1.66 | 456 | 0.746 |
| Example 10 | Bulk propylene | 66.8 | 0.500 | 2.00 | 524 | 0.758 |
| Example 10 | Gas phase | 91.3 | 0.453 | 2.63 | 521 | 0.777 |

Figure 3:
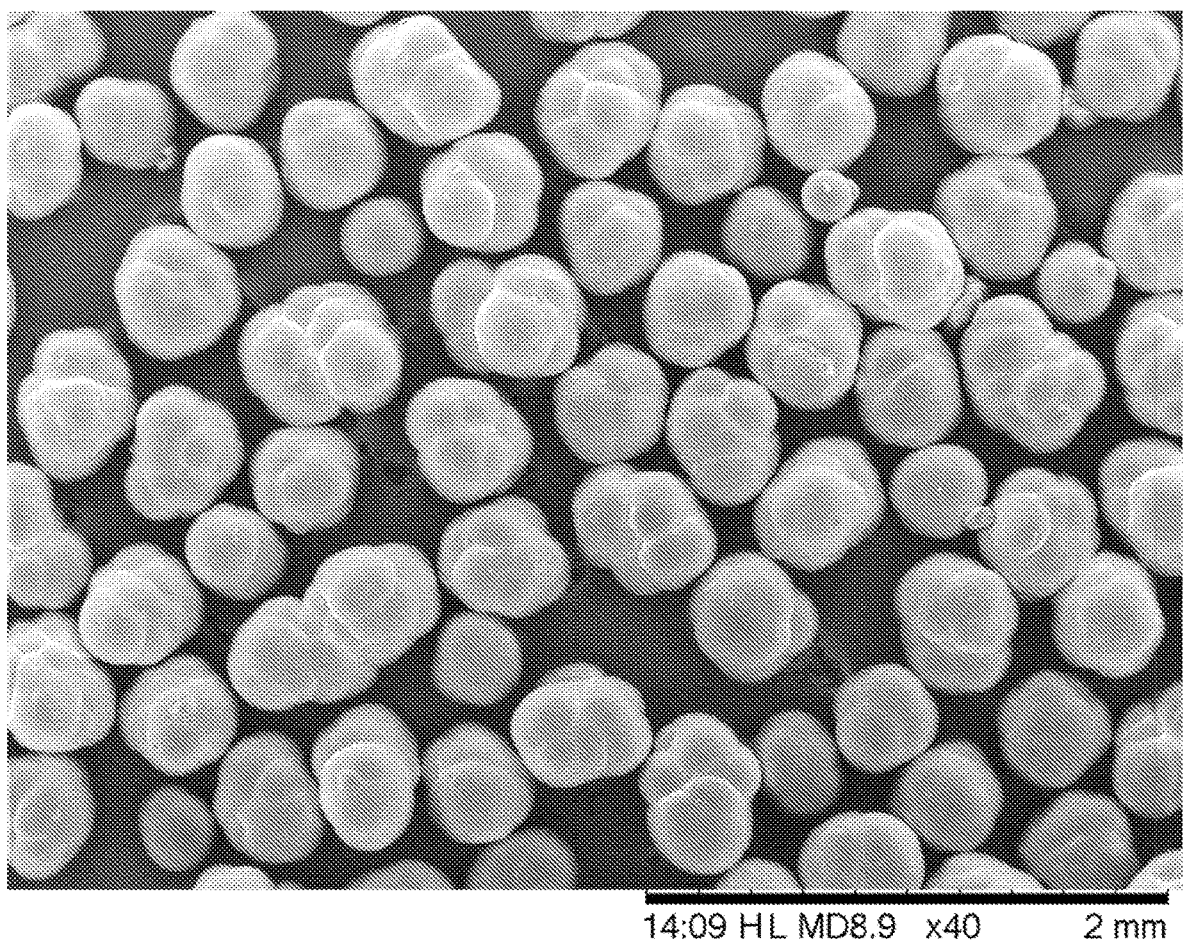
FIG. 3 is SEM images of polymer particles produced bulk propylene polymerization with the activated catalyst component from Example 10.
Figure 4:
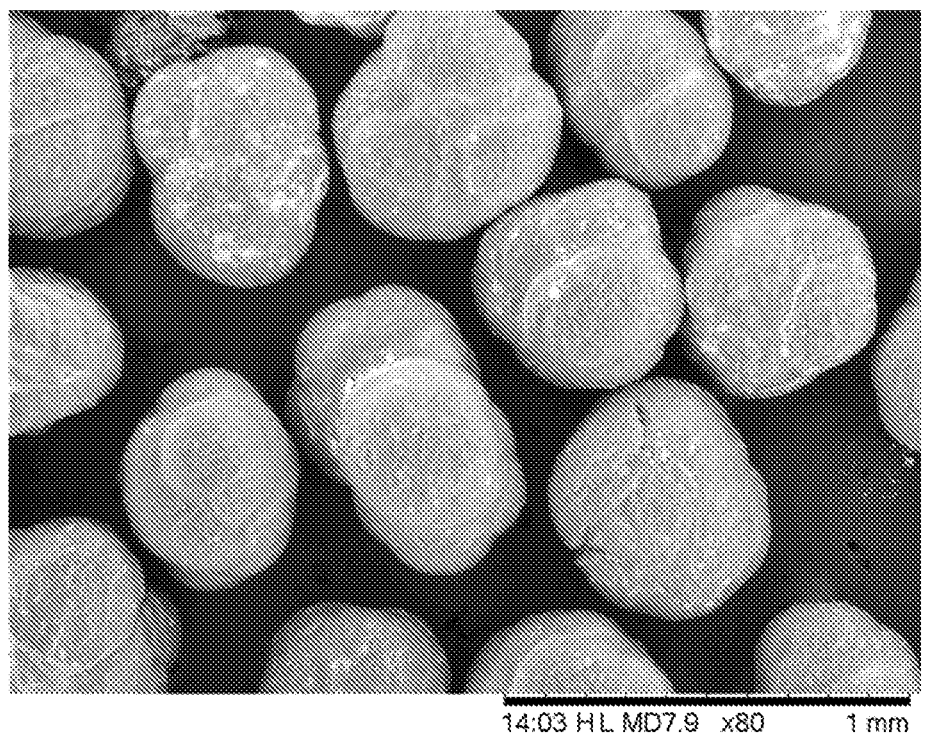
FIG. 4 is SEM images of polymer particles produced with the activated catalyst component from Example 10. Gas Phase propylene polymerization.
Figure 5:
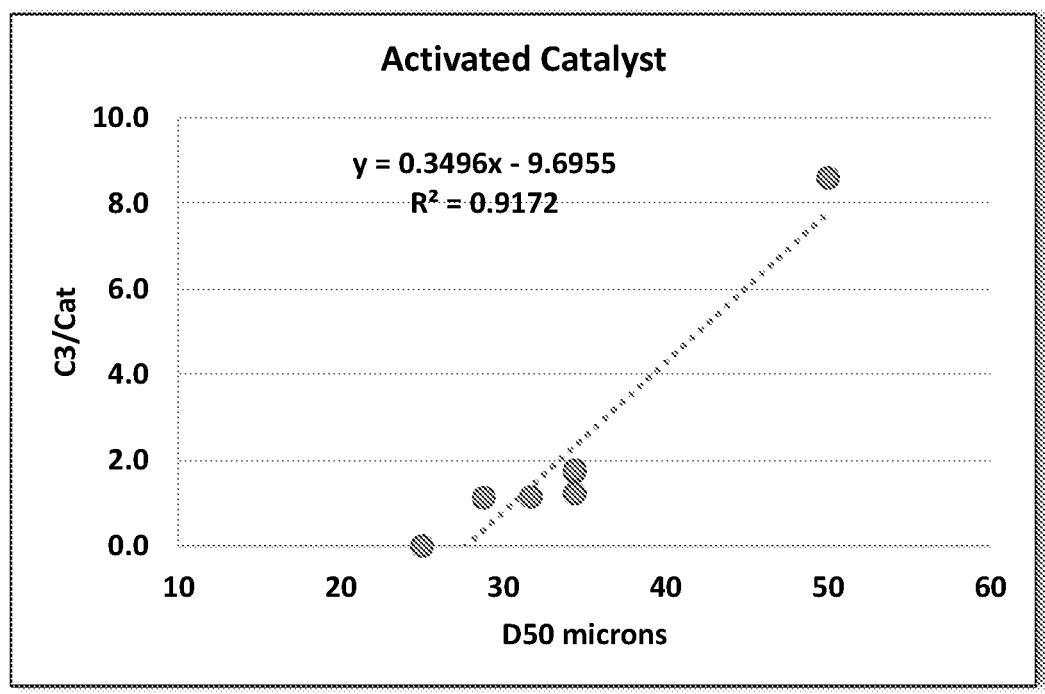
FIG. 5 is a relationship between the pre-poly amount in activated catalyst component and particle size of the activated catalyst component.
Figure 6:
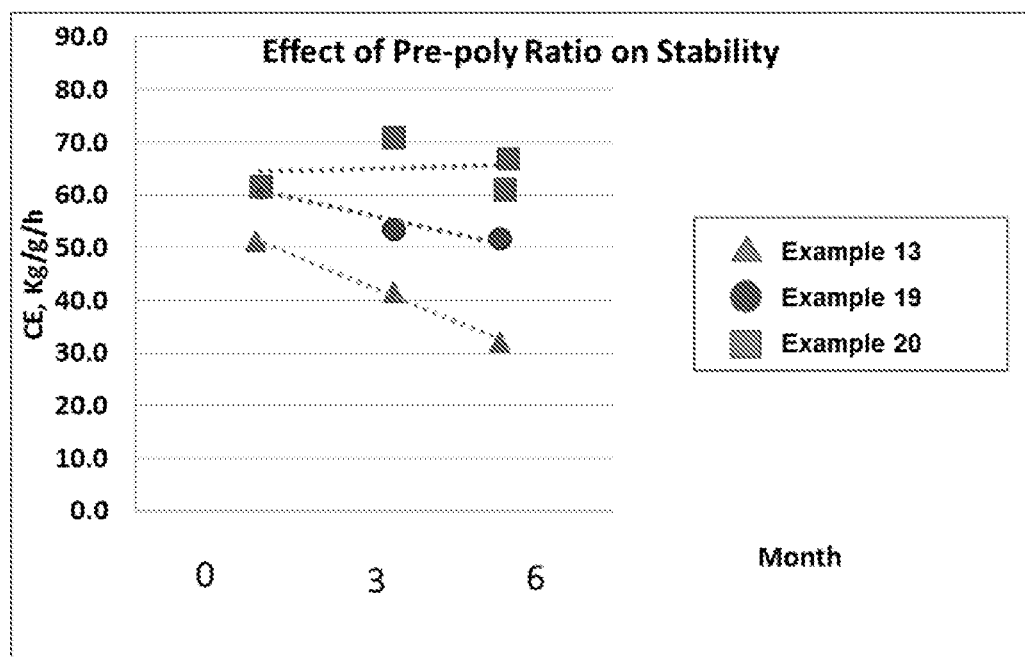
FIG. 6 is a graph illustrating an aging effect of activated catalysts.

The activated catalyst components from Examples 5-9 and 10 produced polymers with high bulk density and improved polymer morphology using the same polymerization process as described. It was found that the polymer particle shape is substantially spherical. The activated catalyst component from Example 10 was tested in bulk and gas phase propylene polymerization. The activated catalyst component showed high catalyst activity and produced a polymer with a very high bulk density (BD=0.50 g/cc in bulk propylene polymerization, and 0.45 g/cc in gas phase reactor). SEM images of polymer particles are shown in FIG. 3 and FIG. 4.

Examples 12-24 demonstrate the performance of the activated catalyst components prepared based on a different catalyst platform. Example 11 (comparative) shows the polymerization behavior of the catalyst component (CONSISTA 601) without being first activated.

Examples 12-24

MO slurry of CONSISTA® catalyst component available from the W.R. Grace Company (41.0 g, 17.1% of solid) was added to a reactor. The solid was washed with hexane and hexane (approximately 200 ml) was added to the reactor. The mixture was agitated at 400 rpm and the temperature of the reactor was cooled down to 0° C. AlEt$_3$ (6.90 g of 25% solution) was added. Immediately C-donor (3.44 g of 10% C-donor) was added. After the agitation for few minutes, propylene was added slowly during 30-60 minutes. The temperature of the reactor was raised to 30° C. and held for a few minutes. The reactor was cooled down to 0° C. Gas propylene was added to reactor during 60-90 minutes. The reactor temperature was raised from 0° C. to 30° C. and held at 30° C. for 1 hour. The solvent was removed, the solid was washed with hexane and dried forming the activated catalyst component A part of the slurry of the activated catalyst component was treated with $CO_2$ (condition 1), another was left without this treatment (condition 2). In some examples the activated catalyst component was washed with TiCl4 (condition 3). The amount of propylene in examples was variable and listed in the tables below.

TABLE 7

Polymerization behavior of activated catalysts prepared based on CONSISTA ® C601 catalysts (bulk propylene polymerization)

| Example | PD | Comments | D50, µ | Span | CE, kg/g/h | XS % | MFR, g/10 min | BD g/cc | PP D50, µ | PP Span |
|---|---|---|---|---|---|---|---|---|---|---|
| Example 11 (comparative) | 0 | Non treated | 25.0 | 0.756 | 85.7 | 2.04 | 0.2 | 0.409 | 1241 | 0.46 |
| Example 12 | 9 | Cond. 1 | 50.0 | 1.161 | 51.3 | 1.64 | 1.1 | 0.423 | 983 | 0.470 |
| Example 13 | 9 | Cond. 2 | 50.0 | 1.161 | 54.8 | 1.69 | 1.3 | 0.422 | 956 | 0.490 |
| Example 14 | 9 | Cond 1/ Cond. 3 | 50.0 | 1.161 | 58.3 | 2.85 | 1.2 | 0.420 | 1043 | 0.480 |
| Example 15 | 9 | Cond. 2/ Cond 3 | 50.0 | 1.161 | 52.1 | 3.33 | 2.1 | 0.407 | 1022 | 0.556 |
| Example 16 | 2.3 | Cond 1 | 36.0 | 1.381 | 58.4 | 2.02 | 1.2 | 0.418 | 1083 | 0.446 |
| Example 17 | 2.3 | Cond. 2 | n/a | n/a | 70.2 | 1.85 | 1.4 | 0.436 | 1028 | 0.490 |
| Example 18 | 1.8 | Cond. 1 | 34.4 | 1.060 | 61.6 | 1.87 | 0.2 | 0.435 | 1067 | 0.533 |
| Example 19 | 1.8 | Cond. 2 | 34.4 | 1.060 | 56.3 | 1.85 | 0.2 | 0.436 | 1012 | 0.5 |
| Example 20 | 1.1 | Cond. 1 | 31.7 | 0.962 | 61.8 | 2.58 | 0.3 | 0.426 | 1174 | 1.199 |
| Example 21 | 1.1 | Cond. 2 | 31.7 | 0.962 | 76.1 | 2.08 | 0.4 | 0.430 | 1156 | 0.700 |
| Example 22 | 1.0 | Cond. 2 | 28.8 | 1.050 | 56.5 | 2.28 | 0.2 | 0.429 | 991 | 0.754 |
| Example 23 | 1.4 | Cond. 4/ Cond. 1 | 32.4 | 1.100 | 62.4 | 1.90 | 0.6 | 0.420 | 1069 | 0.528 |
| Example 24 | 1.4 | Cond. 4/ Cond. 2 | 32.4 | 1.100 | 58.1 | 2.03 | 0.3 | 0.424 | 1033 | 0.485 |

The activated catalyst components were evaluated on the aging effect. The activated catalyst components were kept in mineral oil at 20-22° C. and tested for polymerization. It was found the catalyst component are stable for several months without loss of catalyst activity.

TABLE 8

Aging effect of the activated catalysts (Bulk propylene polymerization)

| Example | PD | Comments | CE, kg/g | XS % | MFR, g/10 min | BD, g/cc | PP D50, µ | PP Span |
|---|---|---|---|---|---|---|---|---|
| Example 11 | 0 | | 85.7 | 2.04 | 0.2 | 0.409 | 1241 | 0.46 |
| Example 20 | 1.1 | Cond. 1 (After 1 week) | 61.8 | 2.58 | 0.3 | 0.426 | 1174 | 1.199 |
| Example 20a | 1.1 | Cond.1 (After 8 months) | 59.7 | 2.38 | 0.6 | 0.422 | 1026 | 0.487 |
| Example 21 | 1.1 | Cond. 2 (After 1 week) | 76.1 | 2.08 | 0.4 | 0.430 | 1156 | 0.700 |
| Example 21a | 1.1 | Cond. 2 (After 8 months) | 61.1 | 2.18 | 0.4 | 0.423 | 1052 | 0.535 |
| Example 23 | 1.4 | Cond. 4/Cond. 1, After I week | 62.4 | 1.90 | 0.6 | 0.420 | 1069 | 0.528 |
| Example 23a | 1.4 | Cond. 4/Cond. 1, After 8 months | 61.0 | 2.35 | 0.5 | 0.419 | 1035 | 0.524 |

TABLE 8-continued

Aging effect of the activated catalysts (Bulk propylene polymerization)

| Example | PD | Comments | CE, kg/g | XS % | MFR, g/10 min | BD, g/cc | PP D50, μ | PP Span |
|---|---|---|---|---|---|---|---|---|
| Example 24 | 1.4 | Cond. 4/Cond. 2 (after 1 week) | 58.1 | 2.03 | 0.3 | 0.424 | 1033 | 0.485 |
| Example 24a | 1.4 | Cond. 4/Cond. 2 (after 8 months) | 56.7 | 2.28 | 0.4 | 0.412 | 1036 | 0.476 |

The propylene polymerization for 1 and 2 hours was used to determine the catalyst stability (lifetime) of the activated catalyst components. The examples demonstrate improvement of the catalyst lifetime when the activated catalyst component was used.

TABLE 9

Comparative lifetime of activated catalysts (Bulk propylene polymerization for one and two hours)

| Example No. | Split: $1^{st}/2^{nd}$ hour |
|---|---|
| LYNX ® 1010 (Commercial phthalate catalyst from Grace) | 50/50 |
| 11 (comparative) | 64/36 |
| 12 | 47/53 |
| 15 | 54/46 |
| 17 | 53/47 |
| 18 | 51/49 |
| 19 | 57/43 |
| 21 | 55/45 |

TABLE 10

Comparison of Catalyst behavior in gasphase reactor: catalyst component CONSISTA ® 601 (comparative Example 25) and activated catalyst component (Example 26). (Gas Phase Polymerization)

| Example | Catalyst Component | CE/ Kg/g/h | BD, g/cc | XS, % | PP D50, μ | B/L3 |
|---|---|---|---|---|---|---|
| Example 25 (comparative) | CONSISTA ® 601 | 62.6 | 0.383 | 2.28 | 1082 | 0.755 |
| Example 26 | From example 21 | 55.0 | 0.428 | 2.39 | 1151 | 0.750 |

The activated catalyst components show high catalyst activity and improved BD of polymer produced. The activated catalyst components are stable for several months without loss of catalyst activity. The more stable activated catalyst components had a low pre-poly ratio.

The activated catalyst components indicate an improvement of kinetics in comparison with the control.

Examples 28-33

Examples 28-33 describe the activated catalyst component composition prepared with another internal donor. CDB-2 internal donor and EB as a supportive donor were used in preparing a high activity activated catalyst components (Table 11). CDB-2 is catechol dibenzoate described in paragraph 52 of U.S. Patent Publication US 2013/0261273, which is incorporated herein by reference. The activated catalyst components were made under the general procedure described in examples 5-7. Example 27 (comparative) presents the non-activated catalyst component prepared with CDB-2 as internal electron donor under the general procedure described in Example 1.

TABLE 11

Activated catalyst component composition prepared with CDB-2 as internal donor

| Example | PD | Ti/Al/C, mol | D50, μ | Span | Ti % | Mg % | CDB-2, % | EB, % |
|---|---|---|---|---|---|---|---|---|
| Example 27 (comparative) | 0 | Non-activated | 20.5 | 0.849 | 3.43 | 16.51 | 12.88 | 5.88 |
| Example 28 | 1.3 | 1/3/0.3 | 23.2 | 1.112 | 1.47 | 7.01 | 5.13 | 0.67 |
| Example 29 | 1.3 | 1/3/0.3 | 24.7 | 0.99 | 1.45 | 7.02 | 5.18 | 0.79 |
| Example 30 | 2.1 | 1/3/0.3 | 27.2 | 1.038 | 0.99 | 4.53 | 3.97 | 0.57 |
| Example 31 | 2.5 | 1/3/0.1 | 27.4 | 1.128 | 0.83 | 4.23 | 4.54 | 0.62 |
| Example 32 | 2.6 | 1/3/0.3 | 28.2 | 1.118 | 0.76 | 3.36 | 5.60 | 0.50 |
| Example 33 | 4.2 | 1/3/0.3 | 34.0 | 1.144 | 0.49 | 2.01 | 2.59 | 0.54 |

Examples 35-40 demonstrate polymerization behavior of the activated catalyst components made with CDB-2 internal donor in bulk propylene polymerization. Example 34 is a comparative example which illustrates polymerization behavior of non-activated catalyst. As can be seeing from Table 10 the activated catalyst components show high catalyst activity in bulk propylene polymerization. In addition, the activated catalyst produces polymer with improved morphology. A bulk density (BD) of polymer produced with the activated catalyst components is higher (0.47 g/cc) than the bulk density for non-activated catalyst (0.41 g/cc) (Table 12).

The activated catalyst demonstrated dramatically improvement of the catalyst life time in comparison with non-activated catalyst (see split of the catalyst activity in $1^{st}$ and $2^{nd}$ hour of polymerization).

Table 14 summarizes polymer morphology data on gas phase testing experiments with an activated catalyst component. There are two important morphology characteristics for polymer production in commercial gas phase processes: they are bulk density of polymer and flowability.

The standardized funnel: high −114 mm, diameter of outlet −8.0 mm, diameter of inlet −93 mm, cone angle −20° was used for polymer flowability measurements. The speed of sample flow through the funnel is determined in g/sec. Each polymer sample was tested three times and average data were analyzed.

Bulk density and flowability of polypropylene powders produced in a gas phase reactor with activated catalyst components are by ~40% higher in comparison with the polymer powders produced with non-activated catalyst.

TABLE 12

Bulk Propylene Polymerization with activated catalyst components containing CDB-2 internal donor

| Example | Catalyst | CE kg/g | Split: 1st/ 2nd hour | MFR, g/10 min | XS, % | BD, g/cc | PP D50, μ | PP Span | B/L3 |
|---|---|---|---|---|---|---|---|---|---|
| Example 34 | From Example 27 (comparative) | 113 | 57.3/42.7 | 0.7 | 2.15 | 0.408 | 1081 | 0.443 | 0.739 |
| Example 35 | From Example 28 | 74 | 46.3/53.7 | 4.4 | 2.21 | 0.470 | 844 | 0.487 | 0.745 |
| Example 36 | From Example 29 | 75.8 | 38.8/61.2 | 1.8 | 2.51 | 0.468 | 847 | 0.643 | 0.737 |
| Example 37 | From Example 30 | 109 | n/a | 0.5 | 2.61 | 0.465 | 933 | 0.415 | 0.748 |
| Example 38 | From Example 31 | 90.6 | 48.4/51.6 | 1.7 | 3.01 | 0.473 | 942 | 0.439 | 0.748 |
| Example 39 | From Example 32 | 70.8 | 32.8/67.2 | 2.1 | 2.6 | 0.466 | 897 | 0.509 | 0.74 |
| Example 40 | From Example 33 | 68.8 | 39.1/60.1 | 4.8 | 2.34 | 0.462 | 931 | 0.902 | 0.719 |

Examples 42-44

Example 42-44 show data on propylene gas phase polymerization with the activated catalyst components containing CDB-2 internal donor. Example 41 is a comparative example testing a non-activated catalyst in a gas phase reactor (Table 11).

Examples 42-44 demonstrate a high catalyst activity of the activated catalyst components in gas phase propylene polymerization under different polymerization conditions (Table 13).

TABLE 13

Gas Phase propylene polymerization with activated catalyst components containing CDB-2 internal donor

| Example | Catalyst | Si/Ti ratio | Donor | H2 (g) | CE kg/g | MFR, g/10 min | X/S, % |
|---|---|---|---|---|---|---|---|
| Example 41 (comparative) | From Example 27 | 6 | C | 1.5 | 73.9 | 97.1 | 3.94 |
| Example 42 | From Example 28 | 14 | ALA | 0.5 | 56.6 | 7.4 | 2.27 |
| Example 43 | From Example 29 | 12 | D | 0.9 | 76.6 | 28.8 | 2.67 |
| Example 44 | From Example 29 | 12 | D | 1.5 | 78 | 67..5 | 2.65 |

TABLE 14

Polymer morphology data on polypropene produced with activated catalyst components

| Catalyst | BD, g/cc | Flowability, g/sec | PP D50 | Span | b/l3 |
|---|---|---|---|---|---|
| Example 41 (comparative) | 0.336 | 2.80 | 906 | 0.635 | 0.71 |
| Example 42 | 0.457 | 3.76 | 835 | 0.482 | 0.741 |
| Example 43 | 0.465 | 4.12 | 924 | 0.539 | 0.713 |
| Example 44 | 0.467 | 4.13 | 916 | 0.504 | 0.716 |

The activated catalyst components have a great benefit in production of impact copolymers, specifically, in ethylene-propylene impact copolymers (ICP). In production of ICPs, the morphology characteristics such as bulk density and flowability are important along with high co-monomer incorporation. Many commercial gas phase processes are challenged to produce impact copolymers with high rubber content due to a limitation of polymer flowability with high comonomer content. The activated catalyst components allow for the production of copolymers with high rubber content while keeping good flowability of the polymer during and after the polymerization process.

Examples 45-49

Example 46-49 demonstrate the production of ethylene-propylene impact copolymers (ICP) with activated catalyst components and properties of polymers produced with these catalysts.

Impact copolymers were produced in a gas phase reactor in two steps. The first step is homo-PP production as described above. The reactor was vented after 30 minutes of propylene polymerization and was charged with ethylene-propylene mixture and the production was continued for 60 minutes. C-donor (cyclohexylmethydimethoxysilane), D-donor (dicyclopentyldimethoxysilane), ALA-activity limiting agent were used as an external donor (Table 15).

The composition of ethylene-propylene comonomers was analyzed by FTIR method. Et %-total ethylene content (w %) in polymer, Ec % -ethylene content (w %) in rubber type polymer, Fc %—rubber content (wt %) in polymer (Table 16).

TABLE 15

Impact copolymer (ethylene/propylene) (ICP) production with activated catalyst components

| Example | Catalyst | TEAl/Ti, mol | Si/Ti, mol | Donor | H2 (g) | Run time, min | C2/C3 Ratio (%) | CE, kg/g | MFI, g/10 min |
|---|---|---|---|---|---|---|---|---|---|
| Example 45 (comparative) | From Example 27 | 90 | 6 | C | 1.5/1.0 | 30/60 | 50 | 62.3 | 32.0 |
| Example 46 | From Example 28 | 90 | 6 | ALA | 1.5/1.0 | 30/60 | 50 | 55.1 | 42.1 |
| Example 47 | From Example 29 | 90 | 15 | D | 2.2/0 | 30/60 | 50 | 98.4 | 2.4 |
| Example 48 | From Example 29 | 90 | 15 | D | 2.2/0 | 30/60 | 60 | 93.9 | 2.4 |
| Example 49 | From Example 29 | 90 | 15 | D | 2.2/0 | 30/60 | 65 | 90.9 | 5.6 |

TABLE 16

Impact copolymer (ethylene/propylene) (ICP) properties

| Example | Catalyst | PP D50, μ | B/L3 | BD, g/cc | Flow-ability, g/sec | Et, % | Ec, % | Fc, % |
|---|---|---|---|---|---|---|---|---|
| Example 45 (comparative) | From Example 27 | 1116 | 0.668 | 0.336 | 2.18 | 7.7 | 37.5 | 20.6 |
| Example 46 | From Example 28 | 849 | 0.738 | 0.476 | 4.52 | 7.5 | 40.4 | 18.5 |
| Example 47 | From Example 29 | 1135 | 0.679 | 0.429 | 3.45 | 10.3 | 26.6 | 38.8 |
| Example 48 | From Example 29 | 1095 | 0.793 | 0.442 | 3.36 | 12.6 | 30.3 | 41.6 |
| Example 49 | From Example 29 | 1020 | 0.703 | 0.440 | 3.52 | 13.4 | 33.4 | 40.3 |

Examples 46-49 (Table 15) demonstrate high activity of the activated catalyst components in impact copolymer production under variable polymerization conditions. The catalyst activity is higher then for the experiment with non-activated catalyst (example 45, comparative).

Table 16 shows the polymer properties of the produced ICP. It is important to point out that the activated catalyst components produce ICP with high ethylene content and excellent polymer morphology having high bulk density and high flowability. The bulk density and flowability of ICP produced with the activated catalyst component 30% to 35% higher than for polymer produced with non-activated catalyst.

Examples 50-53

Examples 50-53 show the oxidation states of titanium atoms in the activated catalyst components prepared under a general procedure described in Examples 5-8 using CDB-1 and CDB-2 internal donors. During the catalyst treatment with TEAl, a titanium atom is reduced from $Ti^{4+}$, originating from $TiCl_4$, to $Ti^{3+}$ and $Ti^{2+}$. The Ti(+3) species are major in the activated catalyst component and the relative amount of Ti(+3) is varied by the activation conditions (Table 17). The amount of reduced titanium species were determined through a titration method described in J. Mol. Cata. A-Chem, 2001, 172, 89-95.

TABLE 17

Oxidation states of titanium atoms in the activated catalyst components

| Example | Condition Ti/D/TEAl (mol) | Donor | Ti (+4) | Ti (+3) | Ti (+2) | % loss of Donor | % loss of EB |
|---|---|---|---|---|---|---|---|
| Example 50 | 1/0/10 | CDB-1 | 16.5 | 70 | 13.5 | n/a | 96.4 |
| Example 51 | 1/1/10 | CDB-1 | Less 1.0 | 90.0 | 10.0 | 48.5 | 90.4 |
| Example 52 | 1/0/10 | CDB-2 | 14.8 | 66.1 | 19.1 | 20.2 | 99.0 |
| Example 53 | 1/1/10 | CDB-2 | 12.6 | 75.8 | 11.6 | 32.1 | 94.1 |

It was demonstrated above a unique performance of the activated catalyst components, such as a high catalyst activity in propylene polymerization and copolymerization, a catalyst stability (aging effect, catalyst storage), high comonomer incorporation and excellent polymer morphology without any catalyst breakage and fines formation, high bulk density and high flowability polymer powder through all polymerization process in bulk propylene and gas phase polymerization reactors. The demonstrated catalyst performance is attributed to the specific catalyst composition and catalyst features which are related to presence of titanium atoms in oxidation state of +4, +3 and +2, a high concentration of internal donor and a small amount of the supportive donor in the activated catalyst component. During the preparation of the activated catalyst component the supportive donor is replaced by an external donor providing very active and stable active polymerization centers which are responsible for production of polymer with described properties.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only and is not intended to limit the invention so further described in such appended claims.

What is claimed is:

1. An activated and non-phthalate solid catalyst component for olefin polymerization comprising a reaction product of:
   (a) a halide-containing magnesium compound;
   (b) a titanium compound containing titanium in an oxidation state of at least +3 and +2;
   (c) an organosilicon compound containing Si—O groups;
   (d) an alkylaluminum compound;
   (e) a supportive electron donor comprising a monobenzoate, the supportive electron donor being present in the catalyst component in an amount from about 0.01% to about 5% by weight;
   (f) at least one internal electron donor, the at least one internal electron donor being present in the catalyst component in an amount from about 1% to about 15% by weight; and
   (g) a polymer formed from an alpha-olefin having the formula: $CH_2=CHR_1$, wherein $R_1$ comprises hydrogen, or a $C_1$ to $C_7$ alkyl group, and being present in the catalyst component in an amount from about 0.3 g to about 200 g of polymer per gram of catalyst component.

2. The activated solid catalyst component of claim 1, wherein the at least one internal electron donor comprises an aryl diester.

3. The activated solid catalyst component of claim 1, wherein the alpha-olefin comprises ethylene or propylene.

4. The activated solid catalyst component of claim 1, wherein the halide-containing magnesium compound comprises magnesium chloride.

5. The activated solid catalyst component of claim 1, wherein the olefin polymer is present in an amount less than or equal to about 20 g of polymer per gram of activated solid catalyst component.

6. The activated solid catalyst component of claim 1, wherein the organosilicon compound is a silane, siloxane or polysiloxane having the following chemical structure:

$R_nSi(OR')_{4-n}$ wherein:
   each R is H, alkyl, or aryl;
   each R' is H, alkyl, aryl, or a $SiR_n'(OR')_{3-n}$; and
   n is 0, 1, 2, or 3.

7. The activated solid catalyst component of claim 1, wherein the internal electron donor is represented by the following formula:

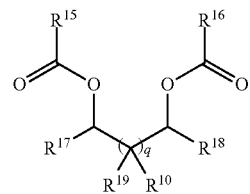

wherein:
   each of $R^{15}$ through $R^{20}$ are independently H, F, Cl, Br, I, alkyl, cycloalkyl, cycloalkylalkyl, aryl, aralkyl, heterocyclyl, heterocyclylalkyl, heteroaryl, or heteroarylalkyl; and
   q is an integer from 0 to 12.

8. The activated solid catalyst component of claim 1, wherein the internal electron donor is represented by one of the following formulas:

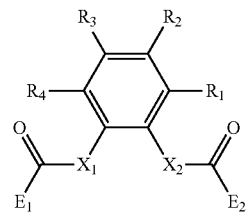

where $R_1$-$R_4$, are the same or different and each $R_1$-$R_4$ is selected from the group consisting of hydrogen, a substituted hydrocarboyl group having 1 to 20 carbon atoms, an a unsubstituted hydrocarboyl having 1 to 20 carbon atoms, a substituted or unsubstituted aryl group having 6 to 20 carbons, an alkoxy group having 1 to 20 carbon atoms, a heteroatom and combinations thereof and at least one of $R_1$-$R_4$ is not hydrogen; and $E_1$ and $E_2$ are the same or different and each $E_1$ and $E_2$ is selected from the group consisting of a substituted hydrocarboyl group having 1 to 20 carbon atoms, an a unsubstituted hydrocarboyl having 1 to 20 carbon atoms, a substituted or unsubstituted aryl group having 6 to 20 carbons, an alkoxy group having 1 to 20 carbon atoms, a heteroatom and combinations thereof wherein $X_1$ and $X_2$ are each O, S, an alkyl group, or $NR_5$ and wherein $R_5$ is a hydrocarbyl group having 1 to 20 carbon atoms or is hydrogen; or

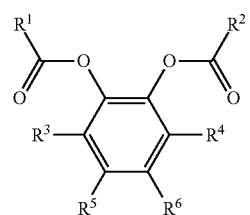

wherein:
  each of $R^1$ through $R^6$ are independently H, F, Cl, Br, I, alkyl, cycloalkyl, cycloalkylalkyl, aryl, aralkyl, heterocyclyl, heterocyclylalkyl, heteroaryl, or heteroarylalkyl; or

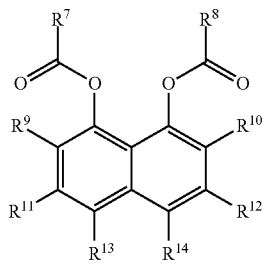

wherein each of $R^7$ through $R^{14}$ are independently H, F, Cl, Br, I, alkyl, cycloalkyl, cycloalkylalkyl, aryl, aralkyl, heterocyclyl, heterocyclylalkyl, heteroaryl, or heteroarylalkyl groups.

9. The activated solid catalyst component of claim 1, wherein the supportive electron donor has the following formula:

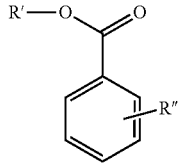

wherein R' comprises an alkyl group, a cyclic group, an aryl group having from 1 to 20 carbon atoms, a heteroatom or a combination thereof, and wherein R" is hydrogen, an alkyl group, a cyclic group, an aryl group having from 1 to 20 carbon atoms, or a heteroatom.

10. The activated solid catalyst component of claim 1, wherein the catalyst component has an average particle size of from about 5 microns to about 300 microns.

11. The activated solid catalyst component of claim 1 further comprising an organic phosphorus compound comprising a phosphate acid ester.

12. The activated solid catalyst component of claim 1 further comprising an activity limiting agent comprising a $C_4$ to $C_{30}$ aliphatic acid ester, a diether, or a poly(alkene glycol) ester of a $C_4$ to $C_{30}$ aliphatic acid.

13. The activated solid catalyst component of claim 1, wherein the supportive electron donor is present in the catalyst component in an amount from about 0.01% to by weight to about 3% by weight and the at least one internal electron donor is present in the catalyst component in an amount from about 3% by weight to about 10% by weight.

14. The activated solid catalyst component of claim 9, wherein the supportive electron donor comprises ethylbenzoate.

15. The activated solid catalyst component of claim 1, wherein a solid catalyst component is formed and then fed to a polymerization reactor for forming the activated solid catalyst having the polymer associated therewith.

16. A process for producing an activated solid catalyst component comprising:
  a. forming a catalyst precursor component by reacting a magnesium alkoxide $Mg(OR)_nX_{2-n}$, or magnesium alcholate $MgX_2mR'OH$ with $Ti(OR'')_gX_{4-g}$ wherein X is Br, Cl, or I; and n is 1 or 2; m is 0.5-10; g is 0, 1, 2, 3, or 4; and R, R', R" are independently $C_1$-$C_{10}$ alkyl, the catalyst precursor further containing a supportive electron donor and an internal electron donor
  b. reacting the product obtained from (a) with a trialkyl aluminum compound in the presence of an organosilicon compound having the following formula $R_{2n}Si(OR_3)_{4-n}$, wherein $R_2$ is H, alkyl, or aryl; each $R_3$ is alkyl, or aryl; n is 0, 1, 2 or 3,
  c. reacting the product obtained in (b) with an olefin having the formula $CH_2$=CHR' wherein R'=H, or a $C_1$-$C_7$ alkyl group and polymerizing the olefin to form a polymer coating on the solid catalyst component particles, the olefin polymer being present in an amount of less than 200 g per 1 g of the activated solid catalyst component,
  d. isolating the activated solid catalyst component.

17. The process of claim 16, wherein an activity limiting agent is further added in step b) and the activity limited agent comprises a $C_4$ to $C_{30}$ aliphatic acid ester, a diether, or a poly(alkene glycol) ester of a $C_4$ to $C_{30}$ aliphatic acid.

18. The process of claim 16, wherein the internal electron donor is represented by one of the following formulas:

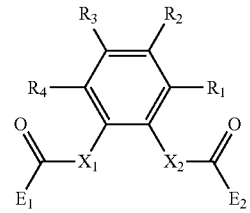

where $R_1$-$R_4$, $E_1$, and $E_2$ are the same or different and each $R_1$-$R_4$, $E_1$, and $E_2$ is selected from the group consisting of hydrogen, a substituted hydrocarboyl group having 1 to 20 carbon atoms, an a unsubstituted hydrocarboyl having 1 to 20 carbon atoms, a substituted or unsubstituted aryl group having 6 to 20 carbons, an alkoxy group having 1 to 20 carbon atoms, a heteroatom and combinations thereof and at least one of $R_2$-$R_4$ is not hydrogen; $E_1$ and $E_2$ are the same or different and each $E_1$ and $E_2$ is selected from the group consisting of a substituted hydrocarboyl group having 1 to 20 carbon atoms, an a unsubstituted hydrocarboyl having 1 to 20 carbon atoms, a substituted or unsubstituted aryl group having 6 to 20 carbons, an alkoxy group having 1 to 20 carbon atoms, a heteroatom and combinations thereof;

and wherein $X_1$ and $X_2$ are each O, S, an alkyl group, or $NR_5$ and wherein $R_5$ is a hydrocarbyl group having 1 to 20 carbon atoms or is hydrogen; or

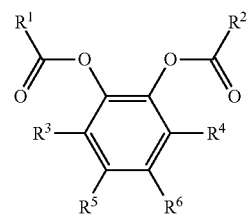

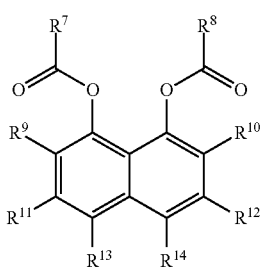

wherein:

each of $R^1$ through $R^{14}$ are independently H, F, Cl, Br, I, alkyl, cycloalkyl, cycloalkylalkyl, aryl, aralkyl, heterocyclyl, heterocyclylalkyl, heteroaryl, or heteroarylalkyl; and q is an integer from 0 to 12, and wherein the supportive electron donor has the following formula:

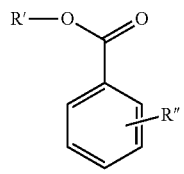

wherein R' comprises an alkyl group, a cyclic group, an aryl group having from 1 to 20 carbon atoms, a heteroatom or a combination thereof, and wherein R" comprises one or more substituted groups, each substituted group can comprise independently hydrogen, an alkyl group, a cyclic group, an aryl group having from 1 to 20 carbon atoms, a heteroatom, or a combination thereof.

19. A process for producing olefin polymers comprising:
polymerizing an olefin in the presence of an activated solid catalyst component in a gas phase polymerization reactor, the activated solid catalyst component comprising:
(a) a halide-containing magnesium compound;
(b) a titanium compound wherein titanium has as oxidation state of at least +3 and +2;
(c) an organosilicon compound containing Si—O groups;
(d) an alkyl-aluminum compound;
(e) a supportive electron donor comprising a mono benzoate, the supportive electron donor being present in the catalyst component in an amount from about 0.01% to about 5% by weight;
(f) at least one internal electron donor, the internal electron donor comprising an aryl diester, the at least one internal electron donor being present in the catalyst component in an amount from about 1% to about 15% by weight; and
(g) a polymer formed from an alpha-olefin having the formula: $CH_2$=$CHR_1$, wherein $R_1$ comprises hydrogen, or a $C_1$ to $C_7$ alkyl group, the alpha-olefin polymer forming a coating on the catalyst particles and being present in the catalyst component in an amount from about 0.3 g to about 200 g of polymer per gram of catalyst particles;
wherein the activated solid catalyst component is prepared outside of the polymerization reactor and fed to the reactor.

20. The process of claim 19, wherein the olefin is polymerized in a fluidized bed.

* * * * *